United States Patent
Guise et al.

(10) Patent No.: US 11,443,318 B2
(45) Date of Patent: Sep. 13, 2022

(54) PHYSICAL AND LOGICAL DETECTIONS FOR FRAUD AND TAMPERING

(71) Applicant: Block, Inc., San Francisco, CA (US)

(72) Inventors: Max Guise, San Francisco, CA (US); Andrew John Leiserson, San Francisco, CA (US); Dino Dai Zovi, New York, NY (US)

(73) Assignee: Block, Inc., San Francisco, CA (US)

( * ) Notice: Subject to any disclaimer, the term of this patent is extended or adjusted under 35 U.S.C. 154(b) by 0 days.

(21) Appl. No.: 16/666,311

(22) Filed: Oct. 28, 2019

(65) Prior Publication Data

US 2020/0065817 A1     Feb. 27, 2020

Related U.S. Application Data

(63) Continuation of application No. 15/043,233, filed on Feb. 12, 2016, now Pat. No. 10,475,034.

(51) Int. Cl.
    *G06Q 20/00*       (2012.01)
    *G06Q 20/40*       (2012.01)
    (Continued)

(52) U.S. Cl.
    CPC ......... *G06Q 20/4016* (2013.01); *G06Q 20/20* (2013.01); *G06Q 20/204* (2013.01);
    (Continued)

(58) Field of Classification Search
    CPC ................................................ G06Q 20/4016
    See application file for complete search history.

(56) References Cited

U.S. PATENT DOCUMENTS

| | | |
|---|---|---|
| 5,870,289 A | 2/1999 | Tokuda et al. |
| 5,960,084 A | 9/1999 | Angelo |
| | (Continued) | |

FOREIGN PATENT DOCUMENTS

| | | |
|---|---|---|
| EP | 2031537 A1 | 3/2009 |
| EP | 3 537 745 A1 | 9/2019 |
| | (Continued) | |

OTHER PUBLICATIONS

Advisory Action dated Dec. 16, 2020, for U.S. Appl. No. 15/940,620, of Aument, T.A., filed Mar. 29, 2018.

(Continued)

*Primary Examiner* — Rokib Masud
(74) *Attorney, Agent, or Firm* — Maynard Cooper & Gale, P.C.; Brian T. Sattizahn, Esq.

(57) ABSTRACT

A payment terminal may include payment interfaces to receive payment information from payment devices such as chip cards and NFC payment devices. Monitoring components may monitor these payment interfaces. In addition, test requests may be transmitted to a payment device in order to elicit responses. The monitored information and the responses may be used by the payment terminal to determine whether a transaction is fraudulent or if a tamper attempt is ongoing, based on local test criteria. In addition, the monitored information and responses may be provided to a server, which may store the monitored information and responses, test for fraudulent transactions and tamper attempts based on server test criteria, and determine updates to the local test criteria.

20 Claims, 7 Drawing Sheets

(51) Int. Cl.
*H04W 12/12* (2021.01)
*G06Q 20/32* (2012.01)
*G06Q 20/20* (2012.01)
*G06Q 20/34* (2012.01)
*H04W 4/80* (2018.01)

(52) U.S. Cl.
CPC ....... *G06Q 20/3278* (2013.01); *G06Q 20/341* (2013.01); *H04W 4/80* (2018.02); *H04W 12/12* (2013.01)

(56) References Cited

U.S. PATENT DOCUMENTS

| | | | |
|---|---|---|---|
| 6,056,193 | A | 5/2000 | McAuliffe et al. |
| 6,786,420 | B1 | 9/2004 | Silverbrook |
| 7,096,192 | B1* | 8/2006 | Pettitt ............... G06Q 30/0609 |
| | | | 701/1 |
| 7,124,170 | B1 | 10/2006 | Sibert |
| 7,343,496 | B1 | 3/2008 | Hsiang et al. |
| 7,533,276 | B2 | 5/2009 | Matsushima et al. |
| 7,837,110 | B1 | 11/2010 | Hess et al. |
| 7,866,544 | B1 | 1/2011 | Block et al. |
| 7,878,397 | B2 | 2/2011 | Mirkazemi-Moud et al. |
| 8,344,881 | B1 | 1/2013 | Hays |
| 8,499,173 | B2 | 7/2013 | Caci |
| 8,786,272 | B2 | 7/2014 | Carapelli et al. |
| 9,342,717 | B2 | 5/2016 | Claessen |
| 9,479,340 | B1 | 10/2016 | Miller et al. |
| 9,575,840 | B1 | 2/2017 | Spangler et al. |
| 9,589,427 | B1 | 3/2017 | Ohlsson |
| 9,659,178 | B1 | 5/2017 | Wade |
| 9,665,870 | B1 | 5/2017 | Rezayee et al. |
| 9,747,570 | B1 | 8/2017 | Vescio |
| 9,778,711 | B2 | 10/2017 | Chang |
| 9,799,180 | B1 | 10/2017 | Rezayee et al. |
| 9,892,293 | B1 | 2/2018 | Wade et al. |
| 10,055,581 | B2 | 8/2018 | Batta et al. |
| 10,127,409 | B1 | 11/2018 | Wade et al. |
| 10,232,326 | B2 | 3/2019 | Simmons |
| 10,255,603 | B1 | 4/2019 | Rezayee et al. |
| 10,262,326 | B1 | 4/2019 | Yaqub |
| 10,282,552 | B1 | 5/2019 | Wade |
| 10,733,291 | B1 | 8/2020 | McLeod |
| 11,257,072 | B1 | 2/2022 | Aument |
| 2003/0194071 | A1 | 10/2003 | Ramian |
| 2004/0095830 | A1 | 5/2004 | Tanaka |
| 2006/0038011 | A1 | 2/2006 | Baker et al. |
| 2006/0118624 | A1 | 6/2006 | Kelso et al. |
| 2006/0155899 | A1 | 7/2006 | Knapp |
| 2007/0080225 | A1 | 4/2007 | Hirasawa et al. |
| 2008/0091605 | A1 | 4/2008 | Hughes et al. |
| 2008/0198653 | A1 | 8/2008 | Brederlow et al. |
| 2008/0238681 | A1 | 10/2008 | Rodgers |
| 2010/0017621 | A1 | 1/2010 | Crawford |
| 2010/0065629 | A1 | 3/2010 | Wentker et al. |
| 2010/0116877 | A1 | 5/2010 | Parmelee et al. |
| 2010/0264211 | A1 | 10/2010 | Jain et al. |
| 2010/0295664 | A1 | 11/2010 | Kim |
| 2010/0327856 | A1 | 12/2010 | Lowy |
| 2011/0078034 | A1* | 3/2011 | Hayhow ............... G06Q 20/20 |
| | | | 705/21 |
| 2011/0107136 | A1 | 5/2011 | Jonnagadla et al. |
| 2011/0187642 | A1 | 8/2011 | Faith et al. |
| 2011/0307711 | A1 | 12/2011 | Novak et al. |
| 2012/0056635 | A1 | 3/2012 | Oomura |
| 2012/0201379 | A1 | 8/2012 | Fuchs et al. |
| 2012/0274351 | A1 | 11/2012 | Pedersen et al. |
| 2013/0044003 | A1 | 2/2013 | Eguro et al. |
| 2013/0086691 | A1 | 4/2013 | Fielder |
| 2013/0119974 | A1 | 5/2013 | Chamarti et al. |
| 2013/0140364 | A1 | 6/2013 | McJones et al. |
| 2013/0179351 | A1 | 7/2013 | Wallner |
| 2013/0223225 | A1 | 8/2013 | Hui et al. |
| 2013/0254431 | A1 | 9/2013 | Kuroiwa et al. |
| 2013/0339739 | A1 | 12/2013 | Hueber et al. |
| 2014/0025960 | A1 | 1/2014 | McLean |
| 2014/0158768 | A1 | 6/2014 | Ray et al. |
| 2014/0181534 | A1 | 6/2014 | Nowottnick |
| 2014/0279103 | A1 | 9/2014 | Course et al. |
| 2014/0297540 | A1* | 10/2014 | Swamy ............... G07F 7/0873 |
| | | | 235/440 |
| 2014/0351125 | A1 | 11/2014 | Miller et al. |
| 2014/0372305 | A1* | 12/2014 | Ray ............... G06Q 10/06 |
| | | | 705/44 |
| 2015/0012430 | A1* | 1/2015 | Chisholm ........... G06Q 20/34 |
| | | | 705/44 |
| 2015/0073980 | A1 | 3/2015 | Griffin et al. |
| 2015/0097572 | A1 | 4/2015 | Wade et al. |
| 2015/0169891 | A1 | 6/2015 | Hook et al. |
| 2015/0213427 | A1 | 7/2015 | Hodges et al. |
| 2015/0331767 | A1 | 11/2015 | Bringivijayaraghavan et al. |
| 2016/0012445 | A1 | 1/2016 | Villa-Real |
| 2016/0029221 | A1 | 1/2016 | Suarez Garcia et al. |
| 2016/0034899 | A1 | 2/2016 | Myers et al. |
| 2016/0078417 | A1 | 3/2016 | Deluca et al. |
| 2016/0080107 | A1 | 3/2016 | Girouard |
| 2016/0117225 | A1 | 4/2016 | Yu et al. |
| 2016/0171486 | A1 | 6/2016 | Wagner et al. |
| 2016/0191120 | A1 | 6/2016 | Dobyns et al. |
| 2016/0203698 | A1 | 7/2016 | Steinbok |
| 2016/0357963 | A1 | 12/2016 | Sherman |
| 2016/0359636 | A1 | 12/2016 | Kreft |
| 2017/0061130 | A1 | 3/2017 | Ghafoor et al. |
| 2017/0103378 | A1 | 4/2017 | Pan |
| 2017/0178103 | A1 | 6/2017 | Peri et al. |
| 2017/0236125 | A1 | 8/2017 | Guise et al. |
| 2018/0053189 | A1 | 2/2018 | Monk et al. |
| 2018/0191775 | A1 | 7/2018 | Watson |
| 2018/0261051 | A1 | 9/2018 | Ool et al. |
| 2018/0295154 | A1 | 10/2018 | Crabtree et al. |
| 2019/0073647 | A1 | 3/2019 | Zoldi et al. |
| 2019/0213845 | A1 | 7/2019 | Goedee et al. |
| 2020/0029218 | A1 | 1/2020 | Hagey et al. |
| 2022/0138755 | A1 | 5/2022 | Aument |

FOREIGN PATENT DOCUMENTS

| | | |
|---|---|---|
| WO | 2017/139633 A1 | 8/2017 |
| WO | 2018/111601 A1 | 6/2018 |

OTHER PUBLICATIONS

Office Action for European Patent Application No. 19171224.9, dated Sep. 11, 2020.
Final Office Action dated Oct. 6, 2020, for U.S. Appl. No. 15/940,620, of Aument, T.A., filed Mar. 29, 2018.
Non-Final Office Action dated Jun. 9, 2020, for U.S. Appl. No. 15/940,620, of Aument, T.A., filed Mar. 29, 2018.
Non-Final Office Action dated Aug. 25, 2016, for U.S. Appl. No. 14/183,118, of Wade, J., filed Feb. 18, 2014.
Non-Final Office Action dated Sep. 15, 2016, for U.S. Appl. No. 15/011,347, of Rezayee, A., et al., filed Jan. 29, 2016.
Notice of Allowance dated Jan. 20, 2017, for U.S. Appl. No. 14/183,118, of Wade, J., filed Feb. 18, 2014.
Notice of Allowance dated Jan. 26, 2017, for U.S. Appl. No. 15/011,347, of Rezayee, A., et al., filed Jan. 29, 2016.
Non-Final Office Action dated Apr. 3, 2017, for U.S. Appl. No. 15/382,165, of Wade, J., et al., filed Dec. 16, 2016.
Notice of Allowance dated Jun. 21, 2017, for U.S. Appl. No. 15/011,367, of Rezayee, A., et al., filed Jan. 29, 2016.
Notice of Allowance dated Sep. 19, 2017, for U.S. Appl. No. 15/382,165, of Wade, J., et al., filed Dec. 16, 2016.
Non-Final Office Action dated Jan. 11, 2018, for U.S. Appl. No. 15/382,122, of Wade, J., et al., filed Dec. 16, 2016.
Non-Final Office Action dated Apr. 18, 2018, for U.S. Appl. No. 15/043,233, of Guise, M., et al., filed Feb. 12, 2016.
Non-Final Office Action dated Jun. 5, 2018, for U.S. Appl. No. 15/693,456, of Rezayee, A., et al., filed Aug. 31, 2017.
Notice of Allowance dated Jul. 26, 2018, for U.S. Appl. No. 15/382,122, of Wade, J., et al., filed Dec. 16, 2016.

(56) References Cited

OTHER PUBLICATIONS

Non-Final Office Action dated Oct. 3, 2018, for U.S. Appl. No. 15/476,324, of Wade, J., filed Mar. 31, 2017.
Final Office Action dated Oct. 19, 2018, for U.S. Appl. No. 15/043,233, of Guise, M., et al., filed Feb. 12, 2016.
Notice of Allowance dated Nov. 28, 2018, for U.S. Appl. No. 15/693,456, of Rezayee, A., et al., filed Aug. 31, 2017.
Notice of Allowance dated Dec. 12, 2018, for U.S. Appl. No. 15/476,324, of Wade, J., filed Mar. 31, 2017.
Advisory Action dated Dec. 31, 2018, for U.S. Appl. No. 15/043,233, Guise, M., et al., filed Feb. 12, 2016.
Non-Final Office Action dated Feb. 7, 2019, for U.S. Appl. No. 15/043,233, of Guise, M., et al., filed Feb. 12, 2016.
Notice of Allowance dated Jun. 27, 2019, for U.S. Appl. No. 15/043,233, of Guise, M., et al., filed Feb. 12, 2016.
International Search Report and Written Opinion for International Application No. PCT/US2017/017453, dated Mar. 30, 2017.
International Search Report and Written Opinion for International Application No. PCT/US2017/064545, dated Feb. 28, 2018.
Extended European Search for European Patent Application No. 19171224.9, dated May 22, 2019.
Notice of Allowance dated Mar. 23, 2020, for U.S. Appl. No. 16/005,192, of McLeod, C., filed Jun. 11, 2018.
Office Action for European Patent Application No. 19171224.9, dated Jan. 27, 2021.
Intention to Grant for European Patent Application No. 19171224.9, dated Jul. 23, 2021.
Non-Final Action dated Jun. 18, 2021, for U.S. Appl. No. 15/940,633, of Aument T.A, filed Mar. 29, 2018.
Notice of Allowance dated Jul. 16, 2021, for U.S. Appl. No. 15/940,620, of Aument, T.A., filed Mar. 29, 2018.
Non-Final Office Action dated Jan. 15, 2021, for U.S. Appl. No. 15/940,620, of Aument, T.A., filed Mar. 29, 2018.
Corrected Notice of Allowability dated Sep. 16, 2021, for U.S. Appl. No. 15/940,620, of Aument, T.A., filed Mar. 29, 2018.
Notice of Allowance dated Sep. 22, 2021, for U.S. Appl. No. 15/940,633, of Aument T.A, filed Mar. 29, 2018.
Notice of Allowance dated Nov. 9, 2021, for U.S. Appl. No. 15/940,633, of Aument T.A, filed Mar. 29, 2018.
Intention to Grant for European Patent Application No. 19171224.9, dated Dec. 16, 2021.
Decision to Grant for European Patent Application No. 19171224.9, dated Apr. 29, 2022.

* cited by examiner

US 11,443,318 B2

PHYSICAL AND LOGICAL DETECTIONS FOR FRAUD AND TAMPERING

This application is a continuation of and claims priority to U.S. patent application Ser. No. 15/043,233 entitled "Physical and Logical Detections for Fraud and Tampering" and filed on Feb. 12, 2016.

BACKGROUND

Electronic payments may be performed in a variety of ways. A payment terminal may process payment transactions, and may interact with payment devices such as a payment card having a magnetic strip that is swiped in a magnetic reader of the payment terminal, a payment device having a Europay/Mastercard/Visa (EMV) chip that is dipped into corresponding EMV slot of the payment terminal, and near field communication (NFC) enabled devices such as a smartphone or EMV card that is tapped at the payment terminal and transmits payment information over a secure wireless connection. The payment terminal may receive payment information from the payment device as well information about a transaction, and may communicate this information to a payment system for processing of the transaction.

As a result of its central role in the transaction processing system, the payment terminal is a prime target for third party attackers attempting to access payment information, process fraudulent transactions, and otherwise engage in fraudulent activities or theft. In many cases, the attackers attempt to physically access components of the payment terminal, such as one or more communication lines carrying data or a processor that communicates and processes payment information. Attackers may attempt to eavesdrop on signals (e.g., a passive attack) or to modify or spoof payment processing communications (e.g., an active attack) by injecting malicious signals into the payment terminal.

A payment terminal may attempt to identify fraudulent transactions and tamper attempts. However, as attackers become more sophisticated, measures such as tamper switches or tamper meshes may be bypassed, or attacks may be performed without gaining physical access to any components of the payment terminal. For example, some attackers may create counterfeit or modified payment cards (e.g., EMV cards), or may construct tamper devices that intercept, forward, or modify signals transmitted between a payment terminal and a payment device. Moreover, a payment terminal may also lack information about other payment transactions that are occurring, and thus, other attempts to engage in fraudulent transactions or to tamper with a payment reader.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Figure 1:
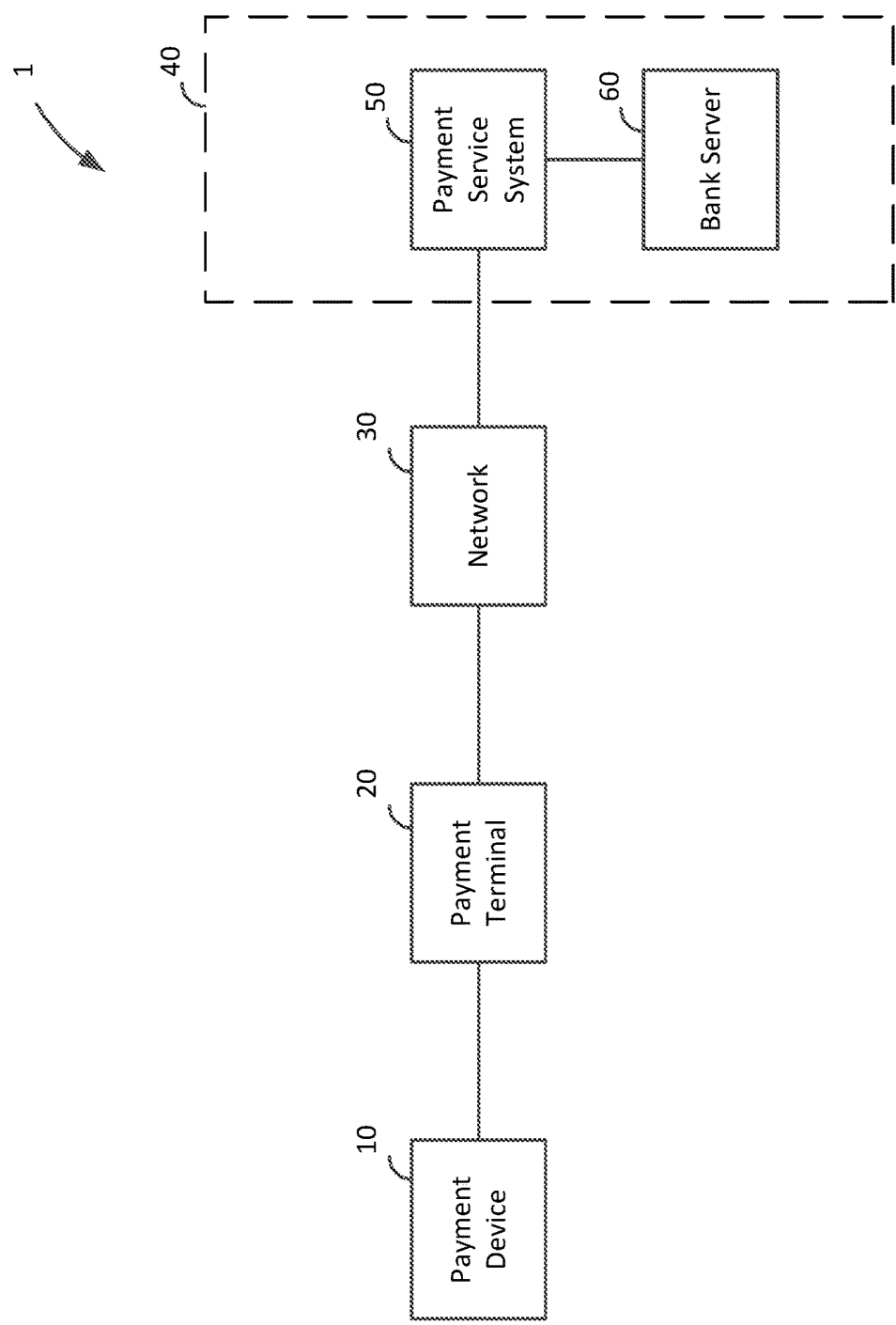
FIG. 1 shows an illustrative block diagram of a payment system in accordance with some embodiments of the present disclosure.

A payment terminal may include a payment reader and a merchant device. The payment reader receives payment information from a payment device such as an EMV chip card, a magnetic stripe card, or a NFC payment device. The merchant device has a point-of-sale application that provides a user interface for a merchant, and that communicates with the payment reader.

The payment reader includes monitoring components that measure electrical characteristics of various components of the payment reader, such as the payment interfaces that interact with the various types of payment devices. Using these monitoring components, the payment reader is able to monitor values such as current, voltage, impedance, and capacitance, to determine whether a component is acting in an abnormal manner. The payment reader may also send test requests, for example, on an input/output line of the interface with an EMV card. Monitoring components may then measure electrical characteristics of the test signal, which may be indicative of a counterfeit card or a tamper device on the input/output line. The payment reader may also send test request messages to a payment device, in order to test whether the payment device responds in an expected manner.

The payment reader may utilize information such as the monitored electrical characteristics and the responses from the payment device to determine whether a fraudulent transaction or tamper attempt is occurring, based on a comparison with local test criteria. In some cases, and depending on the type of fraudulent transaction or tamper attempt, the payment reader may take corrective action such as aborting a payment transaction, temporarily disabling components of the payment reader, or permanently disabling components of the payment reader.

The payment reader may also communicate with a payment service system (for example, through the merchant device and a communications network). In addition to sending payment transaction information to the payment service system, the payment reader may also send the monitored electrical characteristics and the response messages to the payment service system. The payment service system may utilize this information to determine whether a fraudulent transaction or tamper attempt has occurred, based on a comparison with server test criteria. The payment service system may also store this information in a transaction database. Information in the transaction database may also be used to determine whether a fraudulent transaction or a tamper attempt has occurred, for example, based on similar previous transactions.

The payment service system may also update the test criteria used by both the payment reader and the payment service system. As more information about fraudulent transactions and tamper attempts is collected at the transaction database, this information may be used to generate the new test criteria. In addition, the payment service system may receive feedback from other systems, such as whether the payment transaction was improperly denied (a false positive) or improperly accepted (a false negative). This information may also be used to update the test criteria. The updated test criteria for the payment reader may be transmitted to the payment reader and the payment reader may update its local test criteria based on the updated test criteria.

FIG. 1 depicts an illustrative block diagram of a payment system 1 in accordance with some embodiments of the present disclosure. In one embodiment, payment system 1 includes a payment device 10, payment terminal 20, network 30, and payment server 40. In an exemplary embodiment, payment server 40 may include a plurality of servers operated by different entities, such as a payment service system 50 and a bank server 60. These components of payment system 1 facilitate electronic payment transactions between a merchant and a customer.

The electronic interactions between the merchant and the customer take place between the customer's payment device 10 and the merchant's payment terminal 20. The customer has a payment device 10 such as a credit card having magnetic stripe, a credit card having an EMV chip, or a NFC-enabled electronic device such as a smart phone running a payment application. The merchant has a payment terminal 20 such as a payment terminal or other electronic device that is capable of processing payment information (e.g., encrypted payment card data and user authentication data) and transaction information (e.g., purchase amount and point-of-purchase information), such as a smart phone or tablet running a payment application.

In some embodiments (e.g., for low-value transactions or for payment transactions that are less than a payment limit indicated by a NFC or EMV payment device 10) the initial processing and approval of the payment transaction may be processed at payment terminal 20. In other embodiments, payment terminal 20 may communicate with payment server 40 over network 30. Although payment server 40 may be operated by a single entity, in one embodiment payment server 40 may include any suitable number of servers operated by any suitable entities, such as a payment service system 50 and one or more banks of the merchant and customer (e.g., a bank server 60). The payment terminal 20 and the payment server 40 communicate payment and transaction information to determine whether the transaction is authorized. For example, payment terminal 20 may provide encrypted payment data, user authentication data, purchase amount information, and point-of-purchase information to payment server 40 over network 30. Payment server 40 may determine whether the transaction is authorized based on this received information as well as information relating to customer or merchant accounts, and responds to payment terminal 20 over network 30 to indicate whether or not the payment transaction is authorized. Payment server 40 may also transmit additional information such as transaction identifiers to payment terminal 20.

In some embodiments, payment terminal 20 may perform physical and logical testing to collect information that is useful in determining whether or not a transaction is fraudulent or whether an attacker is attempting to tamper with the payment terminal 20. The payment terminal 20 may take corrective action (e.g., aborting a transaction or disabling one or more components of the payment terminal 20) based on a comparison of the collected information to one or more local test criteria. In some embodiments, the information may be transmitted to the payment server 40 (e.g., payment service system 50) for processing. Payment server 40 may determine whether to take corrective action based on the received information as well as information from previous transactions and other ongoing transactions. Payment server 40 may provide a fraud determination message to the payment terminal 20, which may cause the payment terminal 20 to take corrective action. In some embodiments, payment server 40 may also generate updated local test criteria for payment terminal 20 and provide the update for to payment terminal 20 for use in processing of future transactions.

Based on the information that is received at payment terminal 20 from payment server 40, the merchant may indicate to the customer whether the transaction has been approved. In some embodiments such as a chip card payment device, approval may be indicated at the payment terminal, for example, at a screen of a payment terminal. In other embodiments such as a smart phone or watch operating as a NFC payment device, information about the approved transaction and additional information (e.g., receipts, special offers, coupons, or loyalty program information) may be provided to the NFC payment device for display at a screen of the smart phone or watch or storage in memory.

Figure 2:
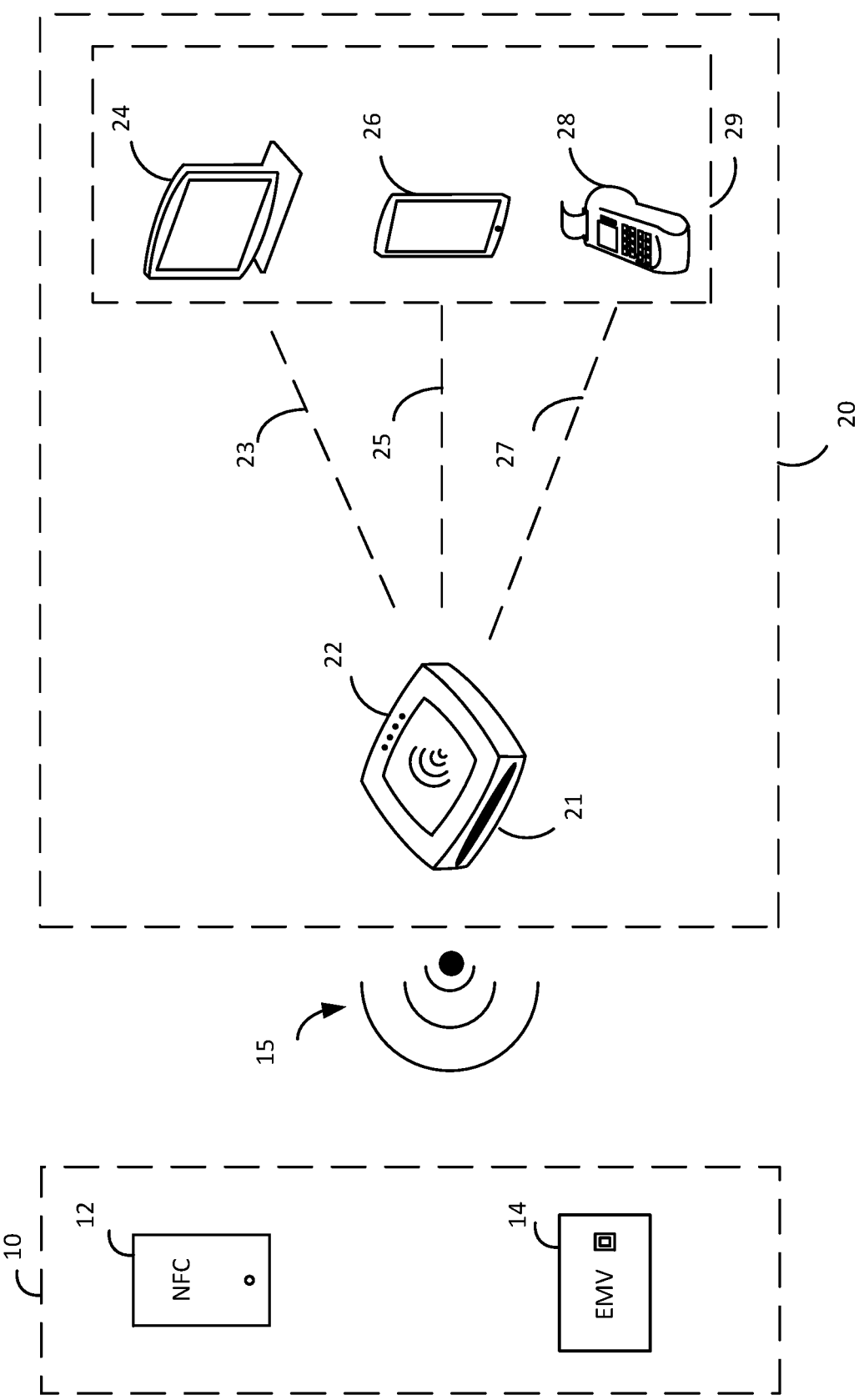
FIG. 2 depicts an illustrative block diagram of a payment device and payment terminal in accordance with some embodiments of the present disclosure.

FIG. 2 depicts an illustrative block diagram of payment device 10 and payment terminal 20 in accordance with some embodiments of the present disclosure. Although it will be understood that payment device 10 and payment terminal 20 of payment system 1 may be implemented in any suitable manner, in one embodiment the payment terminal 20 may comprise a payment reader 22 and a merchant device 29. However, it will be understood that as used herein, the term payment terminal may refer to any suitable component of the payment terminal, such as payment reader 22. In an embodiment, the payment reader 22 of payment terminal 20 may be a wireless communication device that facilitates transactions between the payment device 10 and a merchant device 29 running a point-of-sale application.

In one embodiment, payment device 10 may be a device that is capable of communicating with payment terminal 20 (e.g., via payment reader 22), such as a NFC device 12 or an EMV chip card 14. Chip card 14 may include a secure integrated circuit that is capable of communicating with a payment terminal such as payment terminal 20, generating encrypted payment information, and providing the encrypted payment information as well as other payment or transaction information (e.g., transaction limits for payments that are processed locally) in accordance with one or more electronic payment standards such as those promulgated by EMVCo. Chip card 14 may include contact pins for communicating with payment reader 22 (e.g., in accordance with ISO 7816) and in some embodiments, may be inductively coupled to payment reader 22 via a near field 15. A chip card 14 that is inductively coupled to payment reader 22 may communicate with payment reader 22 using load modulation of a wireless carrier signal that is provided by payment reader 22 in accordance with a wireless communication standard such as ISO 14443.

NFC device 12 may be an electronic device such as a smart phone, tablet, or smart watch that is capable of engaging in secure transactions with payment terminal 20 (e.g., via communications with payment reader 22). NFC device 12 may have hardware (e.g., a secure element including hardware and executable code) and/or software (e.g., executable code operating on a processor in accordance with a host card emulation routine) for performing secure transaction functions. During a payment transaction NFC device 12 may be inductively coupled to payment reader 22 via near field 15 and may communicate with payment terminal 20 by active or passive load modulation of a wireless carrier signal provided by payment reader 22 in accordance with one or more wireless communication standards such as ISO 14443 and ISO 18092.

Although payment terminal 20 may be implemented in any suitable manner, in one embodiment payment terminal 20 may include a payment reader 22 and a merchant device 29. The merchant device 29 runs a point-of-sale application that provides a user interface for the merchant and facilitates communication with the payment reader 22 and the payment server 40. Payment reader 22 may facilitate communications between payment device 10 and merchant device 29. As described herein, a payment device 10 such as NFC device 12 or chip card 14 may communicate with payment reader 22 via inductive coupling. This is depicted in FIG. 2 as near field 15, which comprises a wireless carrier signal having a suitable frequency (e.g., 13.56 MHz) emitted from payment reader 22.

In one embodiment, payment device 10 may be a contactless payment device such as NFC device 12 or chip card 14, and payment reader 22 and the contactless payment device 10 may communicate by modulating the wireless carrier signal within near field 15. In order to communicate information to payment device 10, payment reader 22 changes the amplitude and/or phase of the wireless carrier signal based on data to be transmitted from payment reader 22, resulting in a wireless data signal that is transmitted to the payment device. This signal is transmitted by an antenna of payment reader 22 that is tuned to transmit at 13.56 MHz, and if the payment device 10 also has a suitably tuned antenna within the range of the near field 15 (e.g., 0 to 10 cm), the payment device receives the wireless carrier signal or wireless data signal that is transmitted by payment reader 22. In the case of a wireless data signal, processing circuitry of the payment device 10 is able to demodulate the received signal and process the data that is received from payment reader 22.

When a contactless payment device such as payment device 10 is within the range of the near field 15 it is inductively coupled to the payment reader 22. Thus, the payment device 10 is also capable of modulating the wireless carrier signal via active or passive load modulation. By changing the tuning characteristics of the antenna of payment device 10 (e.g. by selectively switching a parallel load into the antenna circuit based on modulated data to be transmitted) the wireless carrier signal is modified at both the payment device 10 and payment reader 22, resulting in a modulated wireless carrier signal. In this manner, the payment device is capable of sending modulated data to payment reader 22.

In some embodiments, payment reader 22 also includes an EMV slot 21 that is capable of receiving chip card 14. Chip card 14 may have contacts that engage with corresponding contacts of payment reader 22 when chip card 14 is inserted into EMV slot 21. Payment reader 22 provides power to an EMV chip of chip card 14 through these contacts and payment reader 22 and chip card 14 communicate through a communication path established by the contacts.

Payment reader 22 may also include hardware for interfacing with a magnetic strip card (not depicted in FIG. 2). In some embodiments, the hardware may include a slot that guides a customer to swipe or dip the magnetized strip of the magnetic strip card such that a magnetic strip reader can receive payment information from the magnetic strip card. The received payment information is then processed by the payment reader 22.

Because a payment terminal 20 (e.g., a payment reader 22 of payment terminal 20) interfaces with payment devices 10 and processes payment information, the payment terminal 20 is a prime target for attempts to engage in fraudulent transactions or to tamper with the payment terminal 20. Some attackers may engage in passive attacks, where they attempt to intercept NFC communications, read data being communicated over the physical connections with the EMV card, or intercept data from the magnetic stripe of a traditional swiping transaction. Moreover, signals carrying this and other critical information are transmitted within the payment reader and processed by processors and other circuitry of the payment reader. The information that is obtained by such attacks may then be used to engage in fraudulent transactions in a number of ways, such as making purchases using payment information or by obtaining information about the payment terminal 20 (e.g., authentication data, certificate info, or static data authentication (SDA) information) for use in engaging in fraudulent transactions through the payment terminal 20 or by emulating the payment terminal 20.

Some attackers may engage in attacks which involve utilizing devices or counterfeit cards to modify, inject, forward, or otherwise modify the signals (e.g., messages) exchanged between the payment device 10 and the payment terminal 20. Non-limiting examples of such attacks include yes-card attacks, replay attacks, pre-play attacks, downgrade attacks, relay attacks, and man-in-the middle attacks. These devices, counterfeit cards, and attacks are constantly being created, updated, and modified. As described herein, in some embodiments it may be possible to identify the presence of devices or counterfeit cards, or to recognize that an attack is taking place, by monitoring the messages that are being exchanged with the payment terminal 20, monitoring characteristics (e.g., timing, signal waveforms, etc.) of these messages, and by monitoring electrical characteristics or other parameters of the payment terminal 20.

Merchant device 29 may be any suitable device such as tablet payment device 24, mobile payment device 26, or payment terminal 28. In the case of a computing device such as tablet payment device 24 or mobile payment device 26, a point-of-sale application may provide for the entry of purchase and payment information, interaction with a customer, and communications with a payment server 40. For example, a payment application may provide a menu of services that a merchant is able to select and a series of menus or screens for automating a transaction. A payment application may also facilitate the entry of customer authentication information such as signatures, PIN numbers, or biometric information. Similar functionality may also be provided on a dedicated payment terminal 28.

Merchant device 29 may be in communication with payment reader 22 via a communication path 23/25/27. Although communication path 23/25/27 may be implemented via a wired (e.g., Ethernet, USB, FireWire, lightning) or wireless (e.g., Wi-Fi, Bluetooth, NFC, or ZigBee) connection, in one embodiment payment reader 22 may communicate with the merchant device 29 via a Bluetooth classic or Bluetooth low energy interface. In some embodiments processing of the payment transaction may occur locally on payment reader 22 and merchant device 29, for example, when a transaction amount is small or there is no connectivity to the payment server 40. In other embodiments, merchant device 29 or payment reader 22 may communicate with payment server 40 via a public or dedicated communication network 30. Although communication network 30 may be any suitable communication network, in one embodiment communication network 30 may be the internet and payment and transaction information may be communicated between payment terminal 20 and payment server 40 in an encrypted format such by a transport layer security (TLS) or secure sockets layer (SSL) protocol.

Figure 3:
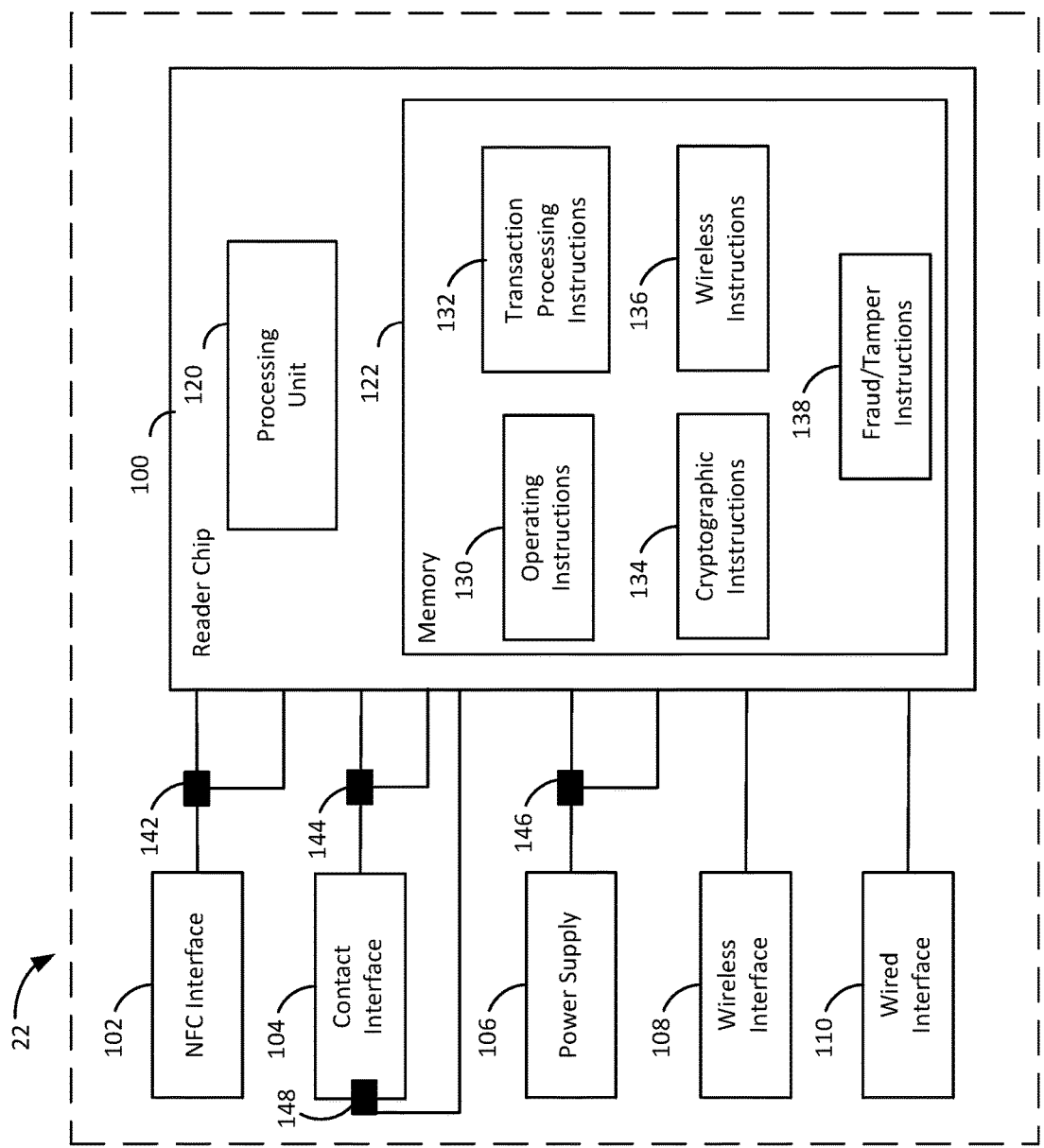
FIG. 3 depicts an illustrative block diagram of a payment reader in accordance with some embodiments of the present disclosure.

FIG. 3 depicts a block diagram of an exemplary payment reader 22 in accordance with some embodiments of the present disclosure. In one embodiment, payment reader 22 may be a wireless communication device that communicates wirelessly with an interactive electronic device such as a merchant device 29, for example, using Bluetooth classic or Bluetooth low energy. Although particular components are depicted in a particular arrangement in FIG. 3, it will be understood that payment reader 22 may include additional components, one or more of the components depicted in FIG. 3 may not be included in payment reader 22, and the components of payment reader 22 may be rearranged in any suitable manner. In one embodiment, payment reader 22 includes a reader chip 100, a plurality of payment interfaces (e.g., a NFC interface 102 and a contact interface 104), a power supply 106, a wireless communication interface 108, and a wired interface 110. Payment reader also includes a processing unit 120 and memory 122. Although in one embodiment the processing unit 120 and memory 122 will be described as packaged in a reader chip 100 and configured in a particular manner, it will be understood that processing unit 120 and memory 122 may be configured in any suitable manner to perform the functionality of the payment reader 22 as is described herein. It will also be understood that the functionality of reader chip 100 may be embodied in a plurality of chips, each including any suitable combination of processing units and memory to collectively perform the functionality of reader chip 100 as described herein.

Payment reader may also include a plurality of monitoring components, each of which is associated with and monitors one or more components of payment reader 22. Although particular monitoring components may be described with respect to certain embodiments of the present disclosure, it will be understood that a monitoring component may include any suitable mechanical components, sensors, switches, hardware, processing units, or any other suitable components necessary to monitor information about components of payment reader 22. Although monitoring components may be associated with any suitable components of payment reader 22, in some embodiments NFC monitoring component 142 may be associated with NFC interface 102, contact monitoring component 144 may be associated with contact interface 104, power supply monitoring component 146 may be associated with power supply 106, and chip card detection component 148 may be associated with contact interface 104.

Processing unit 120 of reader chip 100 of payment reader 22 may include any suitable hardware, software, memory, and circuitry as is necessary to perform and control the functions of payment reader 22. A processing unit 120 may execute instructions stored in memory 122 of reader chip 100 to control the operations and processing of payment reader 22. As used herein, a processor or processing unit may include one or more processors having processing capability necessary to perform the processing functions described herein, including but not limited to hardware logic (e.g., hardware designed by software that that describes the configuration of hardware, such as hardware description language (HDL) software), computer readable instructions running on a processor, or any suitable combination thereof. A processor may run software to perform the operations described herein, including software accessed in machine readable form on a tangible non-transitory computer readable storage medium.

In an exemplary embodiment, the processing unit 120 of reader chip 100 may include two RISC processors configured to perform general processing and cryptographic processing functions based on instructions stored in memory 122, respectively. As used herein, memory may refer to a tangible or non-transitory storage medium. Examples of tangible (or non-transitory) storage medium include disks, thumb drives, and memory, etc., but does not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device.

Reader chip 100 may also include additional circuitry such as interface circuitry, analog front end circuitry, security circuitry, and monitoring component circuitry. In one embodiment, interface circuitry may include circuitry for interfacing with a wireless communication interface 108 (e.g., Wi-Fi, Bluetooth classic, and Bluetooth low energy), circuitry for interfacing with a wired interface 110 (e.g., USB, Ethernet, FireWire, and lightning), circuitry for interfacing with other communication interfaces or buses (e.g., I²C, SPI, UART, and GPIO), circuitry for interfacing with a power supply 106 (e.g., power management circuitry, power conversion circuitry, rectifiers, and battery charging circuitry), and circuitry for interfacing with a contact interface 104 (e.g., power and communication circuitry for directly interfacing with an EMV chip of a chip card 14 that is inserted in slot 21).

In one embodiment, analog front end circuitry of reader chip 100 includes circuitry for interfacing with the analog components of NFC interface 102 (e.g., electromagnetic compatibility (EMC) circuitry, matching circuits, modulation circuitry, and measurement circuitry).

Security circuitry of reader chip 100 may include circuitry for protecting sensitive information such as encryption keys, merchant information, and customer information, as well as circuitry for responding to fraudulent transactions and tamper attempts (e.g., by taking corrective action). In one embodiment, security circuitry may include tamper protection circuitry and electronic fuses for selectively cutting off power or disabling one or more components of reader chip 100 in response to attempts to obtain improper access to reader chip 100, tamper with the payment reader 22, or engage in fraudulent transactions. Security circuitry may cause power to be removed from components or for components to be disabled. The removal or power or disabling of components may be either permanent or temporary, which may vary based on the severity of a security threat. In some embodiments, security circuitry may include circuitry to provide electrical signals to components of payment reader 22. Electrical signals may be provided to cause a particular response by the component of the payment reader 22 (e.g., erasure of information, temporarily disabling a component, modifying operation of a component, or causing any other suitable response), or to impact a device or component that is coupled to or in communication with payment reader 22. For example, in an embodiment an electrical signal (e.g., a signal having a particular voltage, current, waveform, etc.) may be provided to cause damage to a device that is attempting to intercept payment information or inject signals into the payment reader 22 (e.g., a fraudulent EMV card or tamper device coupled to the contact interface 104). Security circuitry may also include circuitry that causes erasure, encryption, obfuscation, or other actions to be performed on sensitive information when a possible tamper attempt or fraudulent transaction is detected.

In one embodiment, monitoring component circuitry may include circuitry for interfacing with any of the monitoring components (e.g., monitoring components 142, 144, 146, and 148), such as signal conditioning circuitry, control circuitry, analog-to-digital conversion circuitry, digital-to-analog conversion circuitry, circuitry for measuring inductance or capacitance, timing measurement circuitry, any other suitable circuitry, or any combination thereof.

NFC interface 102 may provide for NFC communication with a contactless device such as NFC device 12 or chip card 14. Based on a signal provided by reader chip 100, an antenna of NFC interface 102 may output either a carrier signal or a modulated signal. A carrier signal may be a signal having a fixed frequency such as 13.56 MHZ. A modulated signal may be a modulated version of the carrier signal according to a modulation procedure such as ISO 14443 and ISO 18092. When the payment reader 22 is inductively coupled to a contactless device, the contactless device may also modulate the carrier signal, which may be sensed by the NFC interface 102 and provided to the reader chip 100 for processing. Based on these modulations of the carrier signal, payment reader 22 and a contactless device are able to communicate information such as payment information.

NFC monitoring component 142 may monitor any suitable electrical characteristics of NFC interface 102. In some embodiments, NFC monitoring component 142 may provide a signal path to provide one or more analog signals directly to reader chip 100, circuitry (e.g., sensors) for determining information about devices that are in proximity to NFC interface 102, circuitry (e.g., sensors) for providing measurements related to the NFC interface (e.g., signal-to-noise ratios, modulation ratios, energy levels, etc.), any other suitable monitoring component, or any combination thereof. These monitored aspects of NFC interface 102 may provide information that is indicative of attacks, such as the presence of improper devices in proximity to NFC interface 102 while payment information is being exchanged, abnormal modulations of the wireless carrier signal, or attempts to bypass or tamper with the NFC interface 102.

Contact interface 104 may be a suitable interface for providing power to a payment chip such as an EMV chip of a chip card 14 and communicating with the EMV chip. Contact interface 104 may include a plurality of contact pins (not depicted in FIG. 3) for physically interfacing with the chip card 14 according to EMV specifications. In some embodiments, contact interface 104 may include a power supply (VCC) pin, a ground (GND) pin, a reset (RST) pin for resetting an EMV card, a clock (CLK) pin for providing a clock signal, a programming voltage (VPP) pin for providing a programming voltage to an EMV card, an input output (I/O) pin for providing for EMV communications, and two auxiliary pins. In this manner, the payment reader and the chip card are able to exchange information such as payment information.

Contact monitoring component 144 may monitor any suitable electrical characteristics of contact interface 104. In some embodiments, contact monitoring component 144 may provide a signal path to provide one or more analog signals directly to reader chip 100, such as from one or more of the pins of contact interface (e.g., an analog version of the signal that is seen at the I/O pin of the contact interface 104). Contact monitoring component 144 may also include circuitry (e.g., sensors) for providing measurements related to the contact interface (e.g., voltage, current, capacitance, inductance, or any other suitable electrical measurement at one or more of the pins of the contact interface 104), any other suitable monitoring component, or any combination thereof. These monitored aspects of contact interface 104 may provide information that is indicative of attacks, such as the insertion of a counterfeit card into EMV slot 21 (e.g., based on measured electrical characteristics at one or more pins of contact interface 104), the presence of an improper device intercepting information exchanged with a legitimate chip card via contact interface 104 (e.g., on the I/O pin), or the use of a device that simulates an EMV card (e.g., based on abnormal waveforms on the I/O line).

Chip card detection component 148 may also be associated with contact interface 104, and may provide electrical and mechanical components for determining when a chip card is inserted in EMV slot 21. In some embodiments, chip card detection component 148 may include one or more mechanical devices (e.g., switches) that are activated when a chip card meeting EMV card physical specifications (e.g., size, thickness, etc.) is inserted into the EMV slot 21. In some embodiments, chip card detection component 148 may include one or more sensors that sense information about the physical structure of the inserted card, such as size or materials. In some embodiments, chip card detection component 148 may include one or more electrical lines or sensors that provide information about the EMV chip of the inserted card, or in some embodiments, respond in a different manner when a measured electrical signal does not correspond to EMV specifications. It will also be understood that any other suitable chip card detection component 148 may be utilized in accordance with the present disclosure, and that a variety of types of chip card detection components 148 may be used in combination.

Power supply 106 may include one or more power supplies such as a physical connection to AC power or a battery. Power supply 106 may include power conversion circuitry for converting AC power and generating a plurality of DC voltages for use by components of payment reader 22. When power supply 106 includes a battery, the battery may be charged via a physical power connection, via inductive charging, or via any other suitable method.

Power supply monitoring component 146 may monitor any suitable electrical characteristics of power supply 106. In some embodiments, power supply monitoring component 146 may provide a signal path to provide one or more analog signals directly to reader chip 100, such as from the power supply input, a battery, a charging circuit, power conversion circuitry, or any other suitable component of power supply 106. Power supply monitoring component 146 may also include circuitry (e.g., sensors) for providing measurements related to the power supply 106. These monitored power signals may provide information that is indicative of attacks, such as abnormal patterns of connections to a power supply or power usage patterns.

Wireless communication interface 108 may include hardware and software for communicating with external electronic devices using a wireless communication protocol such as Wi-Fi, Bluetooth classic, or Bluetooth low energy. In some embodiments, wireless communication interface 108 may allow payment reader to communicate with one or both of merchant device 29 and payment server 40.

Wired interface 110 may include any suitable interface for wired communication with other devices or a communication network, such as USB, Lightning, FireWire, Ethernet, any other suitable wired communication interface, or any combination thereof. In some embodiments, wired interface 110 may allow payment reader to communicate with one or both of merchant device 29 and payment server 40.

Memory 122 may include a plurality of sets of instructions for performing the processing operations of payment reader 22, such as operating instructions 130, transaction processing instructions 132, cryptographic instructions 134, wireless communication instructions 136, and fraud/tamper instructions 138. Although not depicted in FIG. 3, in some embodiments sensitive information such as the cryptographic instructions 132, encryption keys, passwords, and other similar information may be stored in a logically and physically distinct memory from the other instructions and storage. Memory 122, or portions thereof, may be associated with a processor (e.g. a RISC processor), and may also be associated with particular hardware logic, such as hardware logic associated with electronic fuses, tamper protection circuitry, and cryptographic operations.

Operating instructions 130 may include instructions for controlling any suitable general operations of the payment reader 22, such as internal communications, power management, processing of messages, system monitoring, sleep modes, user interface response and control, and the management of the other sets of instructions. In one embodiment, the operating instructions 130 may provide the operating system and applications necessary to perform most of the processing operations that are performed by the processing unit 120 of the reader chip 100 of payment reader 22.

In addition, operating instructions 130 may include instructions for controlling the interaction between the payment reader 22 and a payment device 10 (e.g., for interfacing with a payment device via the NFC interface 102 and contact interface 104). In one embodiment, the operating instructions may include instructions for generating a wireless carrier signal, providing the wireless carrier signal to NFC interface 102 (e.g., via analog front end circuitry), modulating the wireless carrier signal based on data to be transmitted according to a communication protocol, receiving a modulated wireless carrier signal from the NFC interface 102 (e.g., via analog front end circuitry), demodulating the received modulated wireless carrier signal according to a communication protocol, and determining received data from the demodulated signal. The operating instructions 130 may also include instructions for communicating with a chip card 14 through an I/O line of contact interface 104.

Operating instructions 130 may also include instructions for interacting with a merchant device 29. In one embodiment, the merchant device 29 may be running a point-of-sale application. The operating instructions 130 may include instructions for a complementary application to run on processing unit 120 of reader chip 100, in order to exchange information with the point-of-sale application. For example, the point-of-sale application may provide a user interface that facilitates a user such as a merchant to engage in purchase transactions with a customer. Menus may provide for the selection of items, calculation of taxes, addition of tips, and other related functionality. When it is time to receive payment, the point-of-sale application may send a message to the payment reader 22 (e.g., via wireless interface 108, based on wireless instructions 136). The operating instructions 132 facilitate processing of the payment, for example, by acquiring payment information via the NFC interface 102 or contact interface 104, invoking the transaction processing instructions 132 and cryptographic instructions 134 to process that payment information, and by generating responsive messages that are transmitted to the point-of-sale application of the merchant device via wireless interface 108 based on wireless instructions 136.

Operating instructions 130 may also include instructions for interacting with a payment service system 50 at a payment server 40. In one embodiment, a payment service system 50 may be associated with the payment reader 22 and the point-of-sale application of the merchant device 29. For example, the payment service system 50 may have information about payment readers 22 and merchant devices 29 that are registered with the payment service system 50 (e.g., based on unique identifiers). This information may be used to process transactions with servers of the merchant and customer financial institutions, for providing analysis and reports to a merchant, and aggregating transaction data. The payment reader 22 may process payment information (e.g., based on the transaction processing instructions 132 and the cryptographic instructions 134) and communicate that processed payment information to the point-of-sale application, which in turn communicates with the payment service system 50. In this manner, messages from the payment reader 22 may be forwarded to the payment service system 50 of payment server 40, such that the payment reader 22 and payment service system 50 may collectively process the payment transaction. In some embodiments, the operating instructions may facilitate communication of messages related to fraud and tampering (e.g., based on the fraud/tamper instructions 138) with payment service system 50. In this manner, payment reader 22 and payment service system 50 may interact to determine whether fraudulent transactions and tamper attempts are occurring, to determine corrective action to take in response to fraudulent transaction and tamper attempts, to update a transaction database (e.g., having compiled information for identifying fraudulent transactions and tamper attempts) of the payment service system 50, and communicating updates regarding local test criteria used by the payment reader 22.

Transaction processing instructions 132 may include instructions for processing payment transactions at payment reader 22. In one embodiment, the transaction processing instructions may be compliant with a payment standard such as those promulgated by EMV. Depending on the payment method that is being used (e.g., Europay, Mastercard, Visa, American Express, etc.), a particular processing procedure associated with the payment method may be selected and the transaction may be processed according to that procedure. When executed by processing unit 120, these instructions may determine whether to process a transaction locally, how payment information is accessed from a payment device, how that payment information is processed, which cryptographic functions to perform, the types of communications to exchange with a payment server, and any other suitable information related to the processing of payment transactions.

Cryptographic instructions 134 may include instructions for performing cryptographic operations. Processing unit 120 may execute the cryptographic instructions to perform a variety of cryptographic functions, such as to encrypt, decrypt, sign, or verify a signature upon payment and transaction information as part of a payment transaction. Wireless communication instructions 136 may include instructions for communicating wirelessly with other devices such as an interactive electronic device (e.g., merchant device 29). Although wireless communication instructions 136 may be used for any suitable wireless communications interface 108, in one embodiment, the wireless communication interface 108 may be a Bluetooth interface (e.g., Bluetooth classic, Bluetooth low energy, or both) and the wireless communication instructions 136 may be for the operation of the Bluetooth interface. Processing unit 120 may execute the wireless communication instructions 136 to send and receive messages (e.g., in broadcast or connected modes) to communicate with the merchant device 29.

Fraud/tamper instructions 138 may include instructions for identifying fraudulent transactions, tamper attempts, and other attacks on a payment terminal 20 such as payment reader 22. Although fraud/tamper instructions 138 may perform any suitable operations when executed by processing unit 120, in some embodiments, fraud tamper instructions may operate monitoring components (e.g., monitoring components 142, 144, 146, and 148), process monitoring signals received from the monitoring components, monitor messages exchanged with a payment device, send request messages to test for fraud or tampering, process response messages received in response to the request messages, identify fraud or tampering based on local test criteria, communicate information that relates to fraud or tampering to a payment server 40 (e.g., payment service system 50), receive fraud determination messages from a payment server 40 (e.g., payment service system 50), and take corrective action based on the local test criteria and the fraud determination messages.

In some embodiments, fraud/tamper instructions 138 may include instructions for operating monitoring components (e.g., monitoring components 142, 144, 146, and 148). As described herein, a variety of types of monitoring components may be utilized in accordance with the present disclosure. Fraud/tamper instructions 138 may provide instructions to control signals provided to monitoring component circuitry of reader chip 100, for example, to provide power, test signals, and other suitable signals to the monitoring components. In some embodiments, fraud/tamper instructions 138 may provide instructions to control communication with one or more monitoring components, to provide control messages, receive data, or perform any other suitable functions with the monitoring components. In some embodiments, operating the monitoring components may include providing signals such as test signals or test waveforms to one or more of the monitoring components. For example, in one embodiment a test waveform may be provided to the I/O line of the contact interface 104 via monitoring component 144.

In some embodiments, fraud/tamper instructions 138 may provide instructions to process monitoring signals received from the monitoring components. Monitoring signals may be received at reader chip 100 (e.g., via monitoring component circuitry) in a variety of forms, including analog signals, digital signals, and data signals. Fraud/tamper instructions 138 may provide instructions for processing unit 120 to extract useful data from the received monitoring signals. In some embodiments, extracting useful data may include measuring some aspect of the monitored signal, such as voltage, current, impedance, capacitance, power, energy, waveform shape, etc. In an embodiment, contact monitoring component 144 may receive and monitor the analog signal on the I/O line of the contact interface 104, thus monitoring an output signal transmitted by the reader chip 100 and an input signal received via contact interface 104 during EMV communications. In some embodiments, the monitored signal may be digital or may be converted into a digital signal by an analog-to-digital converter. In some embodiments, fraud/tamper instruction 138 may provide instructions for communicating with a monitoring component by exchanging data, for example, by communicating with monitoring components such as sensors over a data line or communication bus.

In some embodiments, fraud/tamper instructions 138 may provide instructions to monitor messages exchanged with a payment device 10. For example, messages may be exchanged with a payment device via NFC interface 102 or contact interface 104. Processing unit 120 may generate and receive those messages, as described herein, and fraud/tamper instructions 138 may include instructions for monitoring those messages and aspects of those messages, such as their content, sequence, and timing. In some embodiments, the messages may be monitored along with information received from one or more of the monitoring components. For example, the timing of messages that are sent and received over the I/O line via contact interface 104 may be determined based on a monitored signal received from contact monitoring component 144.

In some embodiments, fraud/tamper instructions 138 may provide instructions to send request messages to test for fraud or tampering. Rather than merely monitoring the normal message flow during a payment transaction, fraud/tamper instructions 138 may provide instructions for reader chip 100 to send request messages that are used to test for tamper devices and counterfeit cards, which may respond differently than properly functioning cards in response to atypical messages. In some embodiments, additional messages (e.g., error condition test requests) may be inserted into the normal messaging scheme for exchanging payment information between a payment device and the payment reader. In other embodiments, messages that do not comply with the messaging protocol (e.g., error condition test requests) may be transmitted to the payment device 10. EMV cards that have not been compromised may have known behaviors, e.g., based on the card issuer or manufacturer.

In some embodiments, messages can be sent to test the functioning of the underlying circuitry of the payment device. For example, numerous requests (e.g., random number test requests) may be made for information that includes random numbers. The results may then be tested for randomness. As another non-limiting example, numerous requests may be made in succession, which may test the processing speed and capability of a chip card (e.g., message timing test requests), with any abnormal results likely to correspond to a counterfeit card or tamper device.

In some embodiments, fraud/tamper instructions 138 may provide instructions to process response messages received in response to the request messages. For example, response messages may be associated with a timestamp (e.g., based on data acquired by a monitoring component or based on timing established by message content or by processing unit 102). In some embodiments, data such as a random number may be extracted from the message, or response messages may be associated with request messages.

In some embodiments, fraud/tamper instructions 138 may provide instructions to identify fraud or tampering based on local test criteria. Although fraud or tampering may be identified based on any suitable information, in some embodiments fraud or tampering may be identified based on monitored signals acquired from the monitoring components, monitored responses, monitored timing, transaction information, payment information, or any combination thereof. Local test criteria may be criteria such as thresholds or logical tests that are available to run locally at the same payment terminal 20 device that is interfacing with the payment device 10 on which the (e.g., at a payment reader 22 device that interfaces with NFC device 12 or chip card 14). Local test criteria may allow the payment terminal to respond quickly to certain types of fraudulent transactions and tamper attempts, without having to communicate with another device such as a payment server 40 (e.g., a payment service system 50).

In some embodiments, local test criteria may be updated (e.g., by insertion of a memory device into a port of the payment terminal 20, receiving an update message over a network, or any other suitable manner for providing updates). Processing unit 120 may receive the update and update the local test criteria by modifying the fraud/tamper instructions 138. Local test criteria may also change based on local conditions, which may be determined based on any suitable inputs (e.g., time, location, presence of a network connection, etc.). For example, the local test criteria may be modified (e.g., strengthened) if a payment terminal 20 is not connected to a network, and thus cannot communicate with a payment server 40 to receive fraud determination messages.

One exemplary local test criteria may be a timing test, which may be based on the timing of messages that are exchanged between payment terminal 20 and payment device 10 (e.g., messages exchanged pursuant to an EMV protocol or message timing requests intended to test the timing of particular responses). A tamper device or counterfeit card may not respond within the normal timing patterns as a result of manufacturing, or as the result of an attack (e.g., a relay attack). As described herein, information about the timing may be obtained, for example, based on monitored timing from a monitoring component. A timing test may be performed in a variety of manners. In some embodiments, the time to receive particular response messages (e.g., in an EMV protocol, an answer to reset (ATR) message, an authorization request cryptogram (ARQC) message, etc.) may be compared to a range or threshold. If the timing does not fall within the range or meet the threshold, the timing test may register as a failure. In some embodiments, other aspects of message timing may be considered, such as the relative time it takes for the card to send different message types, overall time to process transactions, etc.

Another exemplary local test criteria may be an error condition test. As described herein, in some embodiments error condition test requests may be transmitted and the timing and content of the responses may be monitored. A tamper device or counterfeit card may respond differently to error condition test requests than an actual chip card. In some embodiments, the monitored timing to respond may be compared to a range or threshold, the content of a response or set of responses may be checked against a logical test, or any combination of these and other techniques may be used to perform the error condition test. An exemplary error condition test may check to see if a response message was received, determine whether the time to receipt exceeds a threshold, and check the response content against expected response content.

Another exemplary local test criteria may be a random values test. A tamper device or counterfeit card may not produce random numbers as well as an actual chip card. As described herein, in some embodiments payment terminal 20 (e.g., reader chip 100 of payment reader 22) may transmit random number test requests to a payment device (e.g., a chip card 14, via the contact interface 104 of payment reader 22) and receive responses. Random numbers or other information that is based on a random numbers may be extracted from the responses. Statistical tests may be performed on the received random numbers to determine whether they are in fact likely to be random or whether there is a high probability that the values of the responses are not random.

Another exemplary local test criteria may be an electrical characteristics test. A tamper device or counterfeit card may impact electrical signals of a payment terminal 20 (e.g., payment reader 22) or may produce electrical signals that are different from expected electrical signals. For example, electrical characteristics (e.g., voltage, current, impedance, capacitance, power, energy) of any of the pins of the contact interface 104 (e.g., the VCC pin, GND pin, RST pin, CLK pin, VPP pin, and I/O pin) may be determined from a monitoring component such as contact monitoring component 144. In some embodiments, a test waveform may be transmitted to one or more of these pins. One or more of the electrical characteristics may be compared to a range or threshold, and in some embodiments, statistics may be calculated from the electrical characteristics. The comparison or statistics may be used to identify a fraud or tamper attempt. For example, in an embodiment the contact monitoring component 144 may monitor the I/O line of contact interface 104. An analog monitoring signal provided by the contact monitoring component 144 may be converted to a digital signal (e.g., using an analog-to-digital converter). Processing unit 120 of reader chip 100 may analyze the waveform (e.g., shape, duty cycle, rise time, fall time, frequency, phase, etc.) of the digitized I/O line signal based on ranges or thresholds from the fraud/tamper instructions 138 to determine whether there is likely to be a counterfeit card or tamper device at the contact interface.

Another exemplary local test criteria may be a card insertion test. During fraudulent transactions or tamper attempts, a tamper device or counterfeit card may not be present at appropriate times, may be present at inappropriate time, or may not have physical packaging (e.g., shape, material, etc.) that complies with specifications. In one embodiment, chip card detection component 148 may provide a detection signal indicating whether the chip card is detected, or in some embodiments, providing information (e.g., related to physical packaging) about an inserted chip card. Processing unit 120 of reader chip 100 may analyze the received detection signal in view of other information (e.g., monitored timing, response messages, electrical characteristics, etc.) to determine whether detection signal indicates that fraud or a tamper attempt is likely occurring (e.g., a detected card exceeding a threshold insertion time, while sending messages that do not result in a completed payment transaction).

Another exemplary local test criteria may be a power supply test. During fraudulent transactions or tamper attempts, a payment terminal 20 (e.g., a payment reader 22) may remain powered on for an abnormal period of time (e.g., an extended period of time) or in abnormal patterns. In an embodiment, power supply monitoring component 146 may monitor power supply 106, and processing unit 120 of reader chip 100 may analyze the monitored power supply signal (e.g., based on thresholds, ranges, patterns, statistics, or other monitored signals) to determine whether fraud or a tamper attempt is likely occurring.

In some embodiments, fraud/tamper instructions 138 may provide instructions that cause a payment terminal 20 (e.g., payment reader 22 of payment terminal 20) to communicate information that relates to fraud or tampering to a payment server 40 (e.g., payment service system 50, via merchant device 29 and network 30). As described herein, a payment terminal 20 may determine electrical characteristics based on signals and data received from monitoring components, may receive responses based on requests provided to a payment device, and may monitor timing of the functioning of the payment terminal (e.g., of monitored responses). In some embodiments, local test criteria may be used to determine fraud or a tamper attempt locally at the payment terminal 20. In some embodiments, some or all of the fraud and tamper detection may be performed remotely from the payment terminal 20 (e.g., the payment reader 22). Thus, in some embodiments a server request message may be generated and sent to the payment server 40 (e.g., payment service system 50). The server request message may include any suitable information, such as monitored electrical characteristics, monitored timing, monitored responses, statistics determined therefrom, transaction information, information about the payment terminal (e.g., location, etc.), environmental information (e.g., temperature, etc.), preliminary assessments based on local test criteria, or any suitable combination thereof. In some embodiments, the server request message may only be sent if the local test criteria indicate that there is likely to be a fraudulent transaction or tamper attempt, for a subset of local test criteria, or based on the severity of a possible fraudulent transaction or tamper attempt.

In some embodiments, fraud/tamper instructions 138 may provide instructions to receive fraud determination messages from a payment server 40 (e.g., payment service system 50). As described herein, a payment server 40 (e.g., payment service system 50) may utilize the information provided in server request messages to determine whether a fraudulent transaction or tamper attempt is occurring, and may respond with a fraud determination message (e.g., by transmitting the fraud determination message to payment reader 22 via network 30 and merchant device 29). Fraud/tamper instructions 138 may cause processing unit 120 of reader chip 100 to extract information from the fraud determination message, such as an indication that a fraudulent transaction or tamper attempt is occurring, information about the type of fraudulent transaction or tamper attempt, and instructions regarding a type of corrective action to perform.

In some embodiments, fraud/tamper instructions 138 may provide instructions for taking corrective action based on the local test criteria and the fraud determination message. Although any suitable corrective action may be taken, in some embodiments corrective action may include aborting a transaction (e.g., ceasing communications with a payment device 10), temporarily or permanently removing power or disabling one or more components of the payment terminal 40 (e.g., using tamper protection circuitry, security circuitry, or electronic fuses), querying the payment device 10 (e.g., sending request messages) to gather additional information about the fraudulent transaction or tamper attempt, or employing countermeasures (e.g., utilizing security circuitry to switch a high current to the I/O line of the payment device 10 via contact interface 104) in an attempt to damage the counterfeit card or tamper device.

Figure 4:
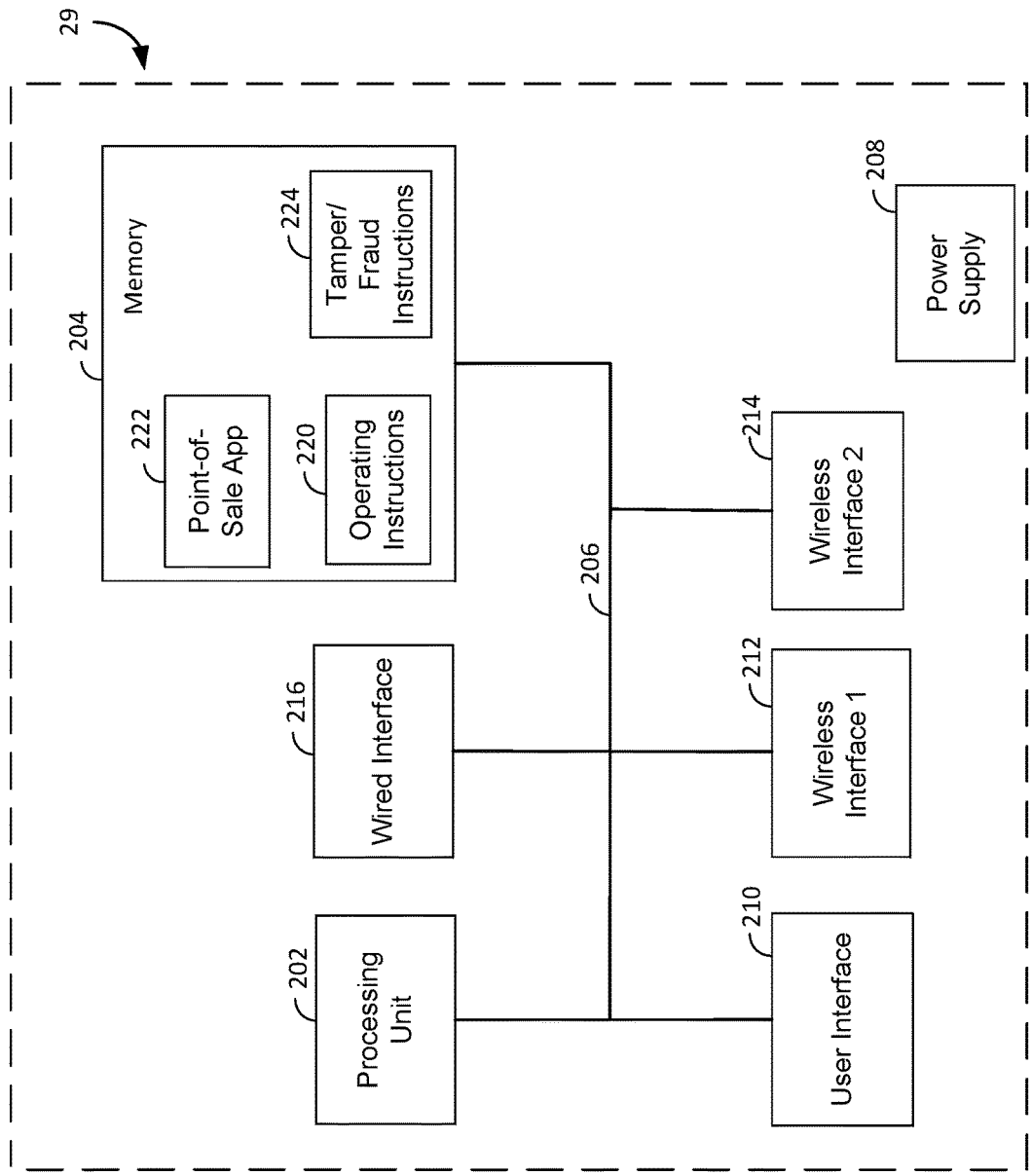
FIG. 4 depicts an illustrative block diagram of a merchant device in accordance with some embodiments of the present disclosure.

FIG. 4 depicts an exemplary merchant device 29 in accordance with some embodiments of the present disclosure. Although a merchant device 29 may be implemented in any suitable manner, in one embodiment the merchant device 29 may be an interactive electronic device that provides a user interface and communicates with one or more other devices. Examples of interactive electronic devices include tablets, smart phones, smart watches, desktop computers, laptop computers, custom electronic devices, or any other suitable electronic device having the necessary user interface and communication capabilities to perform the functions described herein.

Although particular components are depicted in a particular arrangement in FIG. 4, it will be understood that merchant device 29 may include additional components, one or more of the components depicted in FIG. 4 may not be included in merchant device 29, and the components of merchant device 29 may be rearranged in any suitable manner. In one embodiment, merchant device 29 includes a processing unit 202, a memory 204, an interface bus 206, a power supply 208, a user interface 210, a first wireless interface 212, a second wireless interface 214, and a wired interface 216.

In one embodiment, the merchant device 29 includes a processing unit 202 and memory 204 that are configured to control and perform the necessary operations of the merchant device 29. In one embodiment, the processing unit 202 of may be a general purpose processor running instructions for a mobile operating system, programs, and applications based on instructions that may be stored in memory 204. The memory may include any suitable memory types or combination thereof as described herein, such as flash memory and RAM memory, for storing instructions and other data and providing a working memory for the execution of the operating system, programs, and applications of the merchant device 29. In one embodiment, the memory may include a plurality of sets of instructions, such as operating instructions 220, point-of-sale application instructions 222, and tamper/fraud instructions 224.

The processing unit 202 may execute the instructions of memory 204 to interact with and control one or more other components of the merchant device 29. Although the processing unit 202 may communicate with other components of the merchant device 29 in any suitable manner, in one embodiment the processing unit may utilize an interface bus 206. Interface bus 206 may include one or more communication buses such as I²C, SPI, USB, UART, and GPIO. In one embodiment, the processing unit 202 may execute instructions of the memory and based on those instructions may communicate with the other components of the merchant device 29 via the communication buses of interface bus 206.

Merchant device 29 may also include a power supply 208. Power supply 208 may include power conversion circuitry for converting AC power and/or generating a plurality of DC voltages for use by components of merchant device 29. When power supply 208 includes a battery, the battery may be charged via a physical power connection, via inductive charging, or via any other suitable method. Although not depicted as physically connected to the other components of merchant device 29 in FIG. 4, power supply 208 may supply a variety of voltages to the components of merchant device 29 in accordance with the requirements of those components.

Merchant device 29 may also include a user interface 210. User interface 210 may provide various options for the user of the merchant device 29 to interact with applications and programs running on the merchant device 29. An exemplary user interface 210 may include hardware and software for any suitable user interface, such as a touchscreen interface, voice command interface, keyboard, mouse gesture recognition, any other suitable user interface, or any combination thereof. In one embodiment, the user interface 210 may be a touchscreen interface that displays an interactive user interface for programs and applications such as a point-of-sale application running on the merchant device 29, and provides prompts and displays related to fraudulent transactions, tamper attempts, and corrective action.

Merchant device 29 may also include a plurality of wireless communication interfaces. The wireless communication interfaces may include any suitable hardware and software for providing a wireless communication interface such as Bluetooth classic, Bluetooth low energy, WiFi, cellular, short message service (SMS), NFC, any other suitable wireless communication interface, or any combination thereof. A first wireless communication interface 212 may be a wireless communication interface that primarily communicates with payment reader 22 (e.g., a Bluetooth classic and/or Bluetooth low energy interface) while a second wireless communication interface 214 may be a wireless communication interface (e.g., WiFi) that primarily communicates with a payment service system 50 of payment server 40 (e.g., via the internet).

Merchant device may also include a wired interface 216, which may include any suitable interface for wired communication with other devices or a communication network, such as USB, Lightning, FireWire, Ethernet, any other suitable wired communication interface, or any combination thereof.

Memory 204 may include a plurality of sets of instructions for performing the processing operations of merchant device 29, such as operating instructions 220, point-of-sale application instructions 222, tamper/fraud instructions 224, and any other suitable instructions for operating the merchant device 29 (e.g., instructions related to the operation of one or more other applications or components of the merchant device 29).

Operating instructions 220 may include instructions for controlling any suitable general operations of the merchant device 29, such as internal communications, power management, control of I/O devices, control of communication devices, control of other hardware of the merchant device 29, any other suitable instructions, or any combination thereof. In one embodiment, the operating instructions may provide instructions for the operating system of the merchant device 29 as well as most drivers, programs, and applications operating on the merchant device 29.

Operating instructions 220 may include instructions for controlling the operations of the user interface 210. The user interface may be controlled in accordance with the instructions of programs and applications of the operating instructions 220, point-of-sale application instructions 222, and the tamper/fraud instructions 224. In one embodiment, the point-of-sale application instructions 222 may include instructions to display notices of fraudulent transactions and tamper attempts, and to display a menu or other selection option in order to choose a corrective action to be taken by a payment reader 22. The user interface 210 may display the menu or other selection option based on the operating instructions 220 executed by processing unit 202.

Operating instructions 220 may also include instructions for interacting with a payment reader 22 and for interacting with a payment service system 50 at a payment server 40. The payment reader 22 and/or the application running on the merchant device 29 may be known (e.g., via a registration process) to the payment service system 50, such that the merchant device 29 may process payments with the payment service system 50 according to the point-of-sale application instructions.

Point-of-sale application instructions 222 include instructions for running a point-of-sale application on the merchant device 29. When executed by the processing unit 202, the point-of-sale application instructions 222 may provide for a rich display of an interactive interface that allows a merchant to process payment transactions with customers. These instructions may include customized interfaces that allow the merchant or customer to select products for purchase, calculate sales tax, process tips, provide receipts, generate discounts or special offers, process customer loyalty programs, search for items in inventory or for delivery, and perform any other suitable retail operations. In some embodiments, the point-of-sale application instructions may include instructions for providing a rich display of information relating to fraudulent transactions and tamper attempts, and options for selection of corrective action to take in response to fraudulent transactions and tamper attempts.

Tamper/fraud instructions 224 may include any suitable instructions for assisting with fraud and tamper detection, including instructions for offloading a portion of the testing from payment reader 22, providing options for a user interface for controlling operations of payment reader 22, and communications with a payment server 40 (e.g., a payment service system 50). In some embodiments, merchant device 29 may perform some or all of the local analysis (e.g., based on the local test criteria) of information (e.g., monitored responses, monitored timing, and electrical characteristics, transaction information, environmental information, payment reader information) received from payment reader 22. In this manner, payment reader may require less processing capability, or in some embodiments, more complex analysis may be performed at merchant device 29.

Tamper/fraud instructions 224 may include instructions for merchant device 29 (or an integrated payment terminal 20) to provide an interface to respond to potential fraudulent transactions or tamper attempts. In some embodiments, a display may be generated for the user interface that provides information such as a warning of a tamper attempt, and in some embodiments, options to override the warning and process the transaction. Other user interface information may include instructions for handling of the fraudulent transaction or tamper attempt. In some embodiments, user interface information may include an interface for modifying local test criteria, the selection of test criteria to be performed at payment reader 22, the assignment of different forms of corrective action to different types of fraudulent transactions or tamper attempts, any other suitable user interface information, or any suitable combination thereof.

Figure 5:
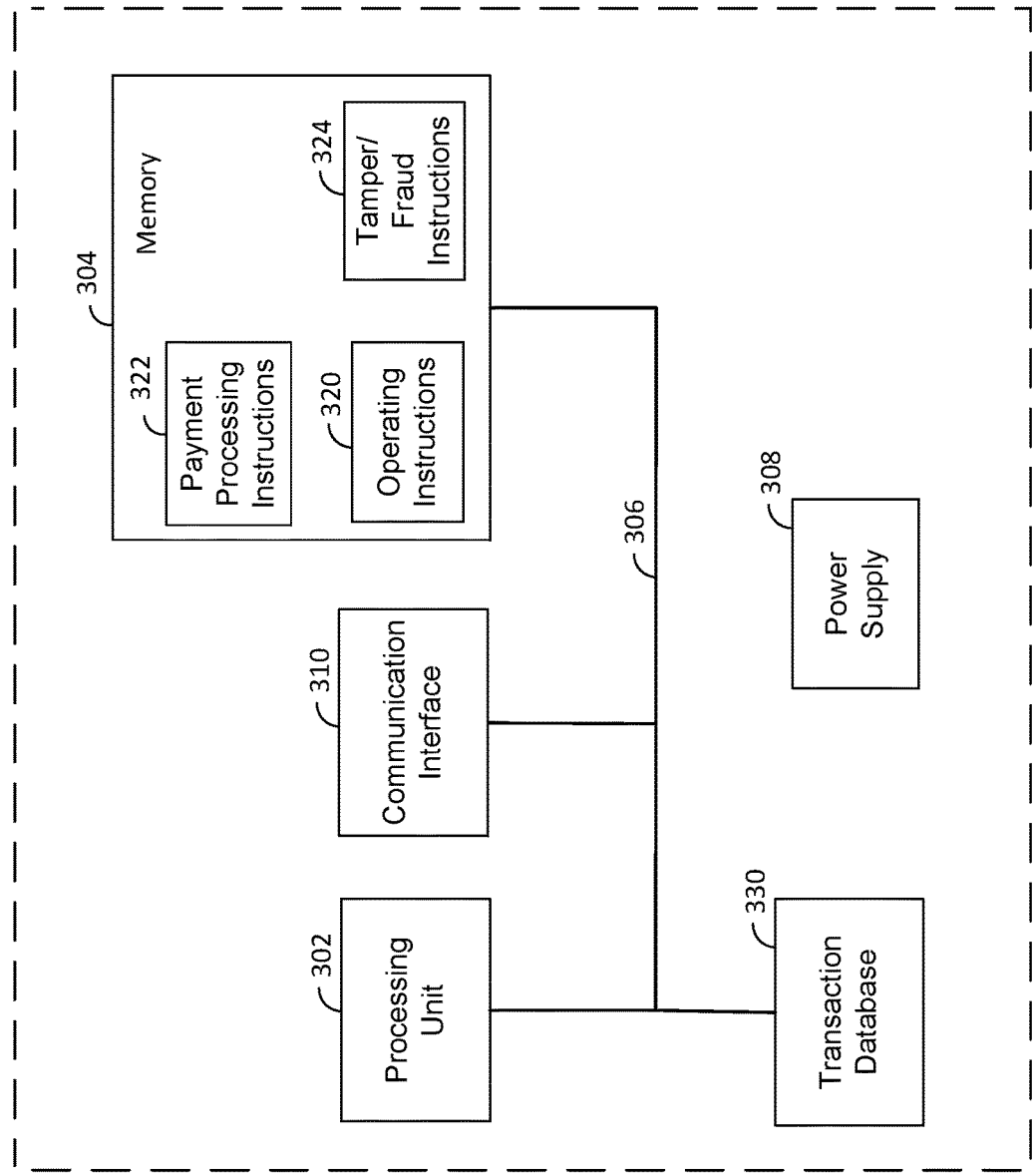
FIG. 5 depicts an illustrative block diagram of a payment service system in accordance with some embodiments of the present disclosure.

FIG. 5 depicts an exemplary payment service system 50 of a payment server 40 in accordance with some embodiments of the present disclosure. Although the payment service system 50 is depicted as a single server, it will be understood that the operations and memory of the payment service system 50 may be distributed over any suitable number of servers. Although particular components are depicted in a particular arrangement in FIG. 5, it will be understood that the payment service system 50 may include additional components, one or more of the components depicted in FIG. 5 may not be included in the payment service system 50, and the components of payment service system 50 may be rearranged in any suitable manner. In one embodiment, payment service system 50 includes at least a processing unit 302, a memory 304, an interface bus 306, a power supply 308, a communication interface 310, and a transaction database 330.

In one embodiment, the payment service system 50 includes a processing unit 302 and memory 304 that are configured to control and perform the necessary operations of the payment service system 50. In one embodiment, the processing unit 302 of may be a high-speed processor running instructions for an operating system for the server, programs, and applications based on instructions that may be stored in memory 304. The memory 304 may include any suitable memory types or combination thereof as described herein for storing instructions and other data and providing a working memory for the execution of the operating system, programs, and applications of the payment service system 50. In one embodiment, the memory may include a plurality of sets of instructions, including but not limited to operating instructions 320, payment processing instructions 322, and tamper/fraud instructions 324.

The processing unit 302 may execute the instructions of memory 304 to interact with and control one or more other components of the payment service system 50. Although the processing unit 302 may communicate with other components of the payment service system 50 in any suitable manner, in one embodiment the processing unit 302 may utilize an interface bus 306. Interface bus 306 may include one or more communication buses such as I²C, SPI, USB, UART, and GPIO. In one embodiment, the processing unit 302 may execute instructions of the memory 304 and based on those instructions may communicate with the other components of the payment service system 50 via the communication buses of interface bus 306.

The payment service system 50 may also include a power supply 308. Power supply 308 may include power conversion circuitry for converting AC power and/or generating a plurality of DC voltages for use by components of the payment service system 50. In some embodiments, power supply 308 may include a backup system such as a battery backup, to avoid interruptions in service during power outages. Although not depicted as physically connected to the other components of the payment service system 50 in FIG. 5, power supply 308 may supply a variety of voltages to the components of the payment service system 50 in accordance with the requirements of those components.

The payment service system 50 may also include a communication interface 310. Although communication interface 310 may include any suitable communication interface or combination thereof, in some embodiments the communication interface 310 may utilize higher speed communication interfaces such as WiFi, cellular, Ethernet, or fiber optics. The communication interface may establish a secured connection (e.g., via TLS or SSL) with a payment terminal 20 (e.g., payment reader 22 via merchant device 29) in order to exchange messages relating to potentially fraudulent transactions or tamper attempts (e.g., server request messages and fraud determination messages). The communication interface may also communicate with other servers of the payment server 40 such as transaction processing servers, which may, in some embodiments, be located remotely from the payment service system 50 and operated by different entities than those that control the payment service system 50. For example, in one embodiment, the payment service system 50 may be operated by an entity that provides one or more of the payment reader 22, merchant device 29, or point-of-sale application. Transaction processing servers may be associated with and operated by one or more of the merchant, issuer, or customer banks.

Memory 304 may include a plurality of sets of instructions for performing the processing operations of the payment service system 50, such as operating instructions 320, payment instructions 322, tamper/fraud instructions 324, and any other suitable instructions for operating the payment service system 50 (e.g., instructions related to the operation of one or more other applications or components of the payment service system 50).

Operating instructions 320 may include instructions for controlling any suitable general operations of the payment service system 50, such as internal communications, power management, control of communication devices, control of other hardware of the payment service system 50, any other suitable instructions, or any combination thereof. In one embodiment, the operating instructions may provide instructions for the operating system of the payment service system 50 as well as most drivers, programs, and applications operating on the payment service system 50.

Operating instructions 320 may also include instructions for interacting with a merchant device 29. In one embodiment, the payment service system 50 may communicate with the merchant device 29 via the communication interface 310. Operating instructions 320 may include instructions that when executed by processing unit 302 control these communications and provide for secure communication by implementing procedures such as TLS, SSL or as encrypted data based on keys.

Payment processing instructions 322 include instructions for processing payments, and may control the content of messages that are communicated to the merchant device 29, payment reader 22 (e.g., via merchant device 29), and/or transaction processing servers. In one embodiment, the payment processing instructions may include information about each payment reader 22 and merchant device 29 having an installed point-of-sale application. In addition to performing payment processing functions such as providing payment information such as amount and a credit card number to a transaction processing system and communicating responses back to the merchant, the payment service system 50 may also perform complex analysis of merchant data that may be used to provide reports, metrics, or other data to a merchant (e.g., a merchant operating a plurality of merchant devices 29 at a plurality of locations). Payment processing instructions 332 may also include instructions for accessing encryption keys such as a shared private key or a key of a public/private key pair for encrypting and decrypting data provided by one or more of a payment device 10, payment reader 22, or merchant device 29.

Tamper/fraud instructions 324 include instructions for identifying fraudulent transactions or tamper attempts based on communications received from payment terminal 20 (e.g., from a payment reader 22 via merchant device 29 and network 40), providing messages to payment terminal 20, logging data (e.g. electrical characteristics, monitored responses, monitored timing, transaction information, environmental data, payment reader information, etc.) received from the payment terminal 20 to transaction database 330, and analyzing data stored in transaction database 330 to identify and update test criteria.

Tamper/fraud instructions 324 may provide instructions for payment service system 50 to receive and process messages (e.g., a server request message) from payment terminal 20 (e.g., from payment reader 22 via merchant device 29, network 30, and communication interface 310). The received messages may include information such as monitored electrical characteristics, monitored timing, monitored responses, transaction information, information about the payment terminal (e.g., location, model, paired merchant devices, etc.), environmental information (e.g., temperature, etc.), statistics determined therefrom, and preliminary assessments based on local test criteria. This information may be compared to server test criteria to determine whether a fraudulent transaction or tamper attempt is occurring. In some embodiments the server test criteria may include the test criteria described above with respect to the local test criteria, as well as additional test criteria involving comparisons with related transactions, concurrent transactions, previous transactions, and feedback information. In some embodiments, server test criteria may be dynamic (e.g., utilizing dynamic thresholds) such that they may be regularly updated based on recent data acquired from payment terminal 20 and other payment terminals 20. The server test criteria may also involve a comparison to similar data from other concurrent or recent transactions, which may allow for detection of patterns of fraudulent activity that may not be readily identified at a single payment terminal (e.g., if a large percentage of recent transactions having similar electrical characteristics, monitored timing, payment terminal characteristics, environmental information, or monitored messages are fraudulent).

Tamper/fraud instructions 324 may provide instructions for payment service system 50 to provide messages to payment terminal 20 (e.g., via fraud determination messages). Once payment service system 30 has determined whether a transaction is fraudulent or if a tamper attempt is occurring, a fraud determination message may be generated. The fraud determination message may include information such as an indication that a fraudulent transaction or tamper attempt is occurring, information about the type of fraudulent transaction or tamper attempt, and instructions regarding a type of corrective action to perform. The fraud determination message may then be transmitted to the payment terminal 20.

Tamper/fraud instructions 324 may provide instructions for logging data (e.g. electrical characteristics, monitored responses, monitored timing, transaction information, payment terminal information, environmental data, etc.) received from the payment terminal 20 to transaction database 330. In addition to data received from payment terminal 20, any other suitable information such as the results of server test criteria and suggested corrective action may be stored in the transaction database 330.

Tamper/fraud instruction 324 may provide instructions for analyzing data stored in transaction database 330. Transaction database 330 may include a large store of transaction information, with millions of transactions being updated daily. The information stored in transaction database 330 includes any suitable information such as electrical characteristics, monitored timing, monitored responses, transaction information, payment terminal information, environmental data, indications of whether a transaction was fraudulent or a tamper attempt has occurred, and a type of corrective action.

In addition, it may be determined by other electronic systems (e.g., a bank server 60) or by other methods (e.g., business or consumer reporting of fraudulent transactions) that fraudulent transactions were not captured by payment reader 22 (e.g., by the local test criteria) or payment server 50 (e.g., by the server test criteria). Such transactions may be referred to as false negatives. It may also be determined by other electronic systems (e.g., a bank server 60) or by other methods (e.g., business or consumer reporting of fraudulent transactions) that transactions were improperly denied by payment reader 22 (e.g., by the local test criteria) or payment server 50 (e.g., by the server test criteria). Such transactions may be referred to as false positives. The false positives and false negatives may provide feedback that may be associated with the information for a transaction and stored in transaction database 330, based on tamper/fraud instructions 324.

It may also be determined by other electronic systems (e.g., a bank server 60) or by other methods (e.g., business or consumer reporting of fraudulent transactions) that new or modified methods of engaging in fraudulent transactions or tamper attempts are being performed, and criteria for these may be provided to payment service system. Such criteria may provide feedback that is referred to as externally updated criteria. Local test criteria and server test criteria may be updated based on these externally updated criteria and tamper/fraud instructions 324.

Although analysis of the data stored at transaction database 330 may be performed in any suitable manner, in some embodiments machine learning techniques may be used to analyze the data. It will be understood that the availability of this large volume of information relevant to fraudulent transactions and tamper attempts enables complex analyses that improve the responsiveness of the payment processing system. By fine tuning server test criteria and local test criteria, the test criteria can be dynamically calibrated to avoid false positives (e.g., false determinations that a transaction is fraudulent or that a tamper attempt is occurring) while capturing new types of attacks or improved attacks. Payment service system 50 may determine that certain data captured by payment terminal 20 is highly likely to be the result of a fraudulent transaction or tamper attempt, and generate local test criteria accordingly. The local test criteria may then be updated via an update message. Payment service system may similarly update the server test criteria.

Figure 6:
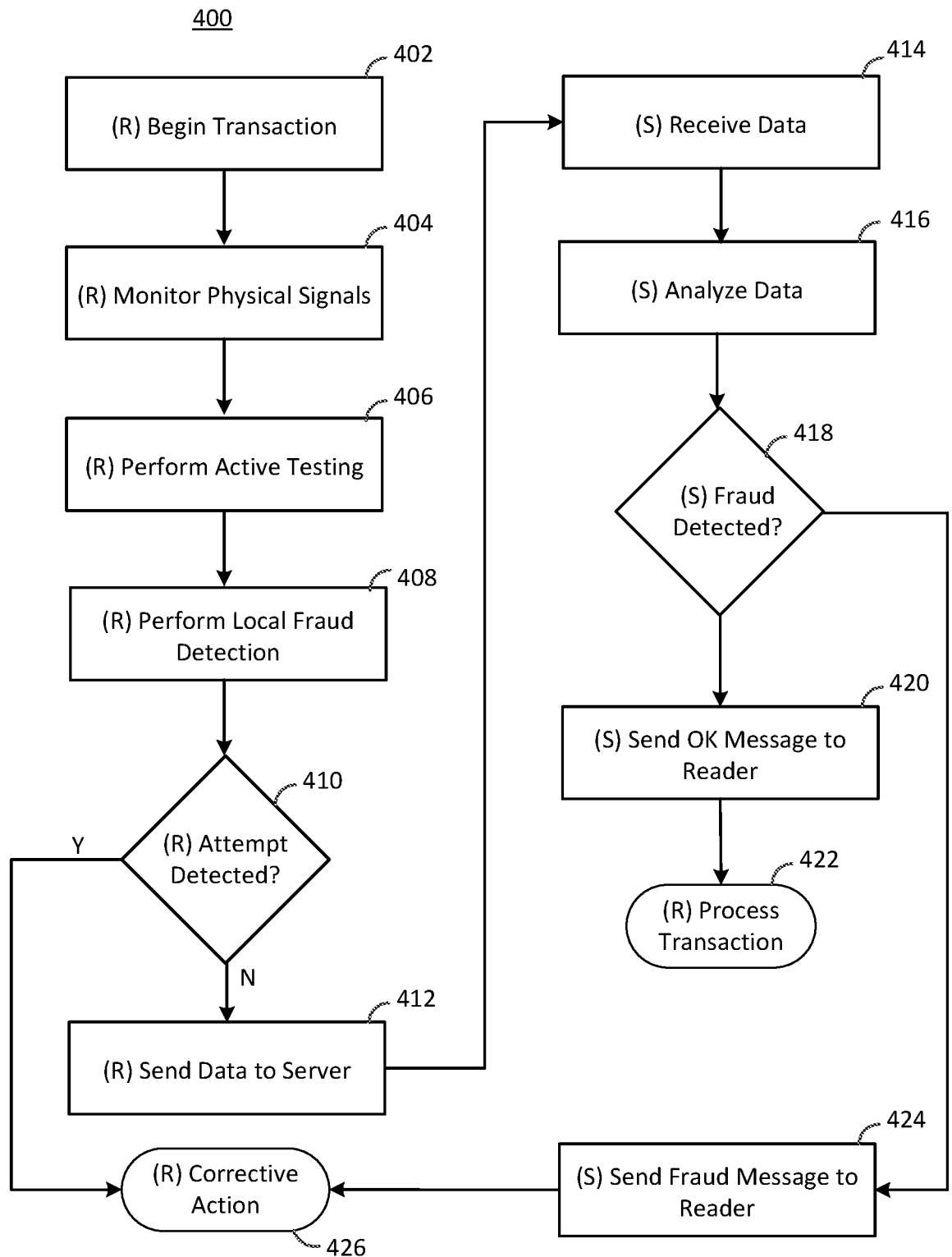
FIG. 6 depicts a non-limiting flow diagram illustrating exemplary methods for physical and logical detections for fraud and tampering in accordance with some embodiments of the present disclosure.
Figure 7:
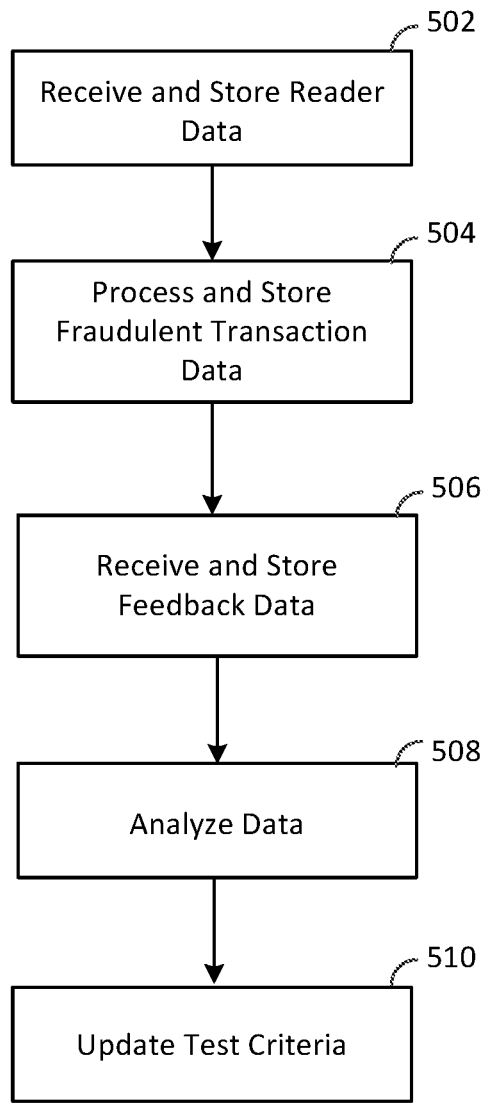
FIG. 7 depicts a non-limiting flow diagram illustrating exemplary methods for updating test criteria in accordance with some embodiments of the present disclosure.

In view of the structures and devices described supra, methods that can be implemented in accordance with the disclosed subject matter will be better appreciated with reference to the flowcharts of FIGS. 6-7. While, for purposes of simplicity of explanation, the methods are shown and described as a series of steps, it is to be understood and appreciated that such illustrations or corresponding descriptions are not limited by the order of the steps, as some steps may occur in different orders and/or concurrently with other steps from what is depicted and described herein. Any non-sequential, or branched, flow illustrated via a flowchart should be understood to indicate that various other branches, flow paths, and orders of the steps, can be implemented which achieve the same or a similar result. Moreover, not all illustrated steps may be required to implement the methods described hereinafter.

FIG. 6 depicts steps 400 for performing physical and logical detection of fraudulent transactions and tamper attempts in accordance with some embodiments of the present disclosure. In one embodiment, as is depicted in FIG. 6, steps 400 are performed by a payment terminal device such as a payment reader 22 (indicated with an (R) in FIG. 6) and a payment service system 50 of a payment server 40 (indicated with a (S) in FIG. 6). Although these steps are described as being performed by particular devices in one embodiment, it will be understood that the allocation of the steps between the devices may be modified in any suitable manner or that the number of devices performing the steps may be modified in any suitable manner.

At step 402, processing unit 120 of payment reader 22 may begin a payment transaction with a payment device 10, such as a NFC device 12 or an EMV chip 14. In some embodiments (not depicted in FIG. 6) the remaining steps of FIG. 6 may be performed even when a transaction has not been initiated. In this manner, it may be possible to check for tamper attempts even when transactions are not being processed. Once a payment transaction has been initiated at step 402, processing may continue to step 404.

At step 404, processing unit 120 of payment reader 22 may monitor physical signals based on the fraud/tamper instructions 138. Although any suitable physical signals may be monitored in any suitable manner, in some embodiments monitoring components such as NFC monitoring component 142, contact monitoring component 144, power supply monitoring component 146, and chip card detection component 148 may be monitored as described herein. In some embodiments, signals may be provided to one or more monitoring components, such as a test waveform. Although these monitored physical signals may be used to determine any suitable information, in some embodiments electrical characteristics, detection signals, and monitored timing may be determined based on the monitored physical signals. Processing may then continue to step 406.

At step 406, processing unit 120 of payment reader 22 may perform active testing based on the fraud/tamper instructions 138. Although any suitable active testing may be performed in accordance with the present disclosure, in some embodiments active testing may include providing signals and messages, such as request messages (e.g., random number test requests, error condition test requests, and message timing test requests). Based on the responses received from the payment device, and in some embodiments other signals (e.g., electrical characteristics and timing information), information such as monitored responses and monitored timing may be obtained. Processing may then continue to step 408.

At step 408, processing unit 120 of payment reader 22 may perform local fraud and tamper detection based on the fraud/tamper instructions 138. Although fraud and tamper detection may be performed locally in any suitable manner, in some embodiments the information gathered in steps 404 and 406 may be analyzed in accordance with local test criteria. Processing may then continue to step 410, in which it is determined from the analysis at step 408 whether a fraudulent transaction or tamper attempt has been detected, such that the payment reader 22 should take corrective action immediately, in which case processing may continue to step 426. In some embodiments as depicted in FIG. 6, if the local test criteria do not indicate that corrective action should be taken immediately, processing may continue to step 412. However, it will be understood that in some embodiments (not depicted in FIG. 6), processing may only continue to step 412 if the local test criteria indicate that a suspicious transaction (e.g., that does not require immediate corrective action) has occurred.

At step 412, processing unit 120 of payment reader 22 may send information to a server based on the fraud/tamper instructions 138. Although any suitable information may be sent to any suitable server, in some embodiments payment reader 22 may send a server request message to a payment service system 50 of a payment server 40 via merchant device 29 and network 30. Although it will be understood that any suitable information may be provided in the server request message, in some embodiments the information may include monitored electrical characteristics, monitored timing, monitored responses, transaction information, information about the payment terminal (e.g., location, etc.), environmental information (e.g., temperature, etc.), statistics determined therefrom, and preliminary assessments based on local test criteria. Processing may then continue to step 414.

At step 414, processing unit 302 of payment service system 50 may receive the information (e.g., the server request message) via communication interface 310 based on operating instructions 320 and tamper/fraud instructions 324. The received information (e.g., monitored electrical characteristics, monitored timing, monitored responses, transaction information, information about the payment terminal (e.g., location, etc.), environmental information (e.g., temperature, etc.), statistics determined therefrom, and preliminary assessments based on local test criteria) may be extracted from the server request message for processing by the payment service system 50. Processing may then continue to step 416.

At step 416, processing unit 302 of payment service system 50 may analyze the received information based on the tamper/fraud instructions 324. In some embodiments, the received information may be analyzed using server test criteria and based on other sources of information, such as previously stored information from the same payment terminal 20 (e.g., payment reader 22 of payment terminal 20), from the same payment device 10, from other payment terminals, and from other payment devices. The received information may also be analyzed based on other transactions that are happening concurrently. The received information may also be stored, such as in transaction database 330. Processing may then continue to step 418.

At step 418, processing unit 302 of payment service system 50 may determine whether a fraudulent transaction or tamper attempt has been detected based on the tamper/fraud instructions 324. As described herein, in some embodiments the received information may be analyzed based on the server test criteria, information stored in the transaction database 330, and concurrent payment transactions. If it is determined that a fraudulent transaction or tamper attempt has occurred, processing may continue to step 424. If it is determined that a fraudulent transaction or tamper attempt has not occurred, processing may continue to step 420.

At step 420, processing unit 302 of payment service system 50 may send a message to the payment terminal 10 indicating that the transaction should be processed, based on the operating instructions 320, the payment processing instructions 322, and tamper/fraud instructions 324. In some embodiments, payment service system may communicate with one or more servers such as a bank server 60, process the transaction, generate an approval message indicating that the transaction has been approved and including information regarding the processed transaction, and transmit the message to payment reader 22 via network 30 and merchant device 29. Processing may then continue to step 422.

At step 422, processing unit 120 of payment reader 22 may process the transaction based on the approval message and the transaction processing instructions 132. Once the transaction has been processed, the processing of steps 400 may end.

At step 424, processing unit 302 of payment service system 50 may generate and send a message such as a fraud determination message to a payment terminal 20 (e.g., payment reader 22) based on the operating instructions 320 and the tamper/fraud instructions 324. In some embodiments, the fraud determination message may include information such as an indication that a fraudulent transaction or tamper attempt is occurring, information about the type of fraudulent transaction or tamper attempt, and instructions regarding a type of corrective action to perform. Processing may then continue to step 426.

At step 426, processing unit 120 of payment reader 22 may take corrective action based on the fraud/tamper instructions 138. As described herein, the processing of step 426 may occur based on a determination at either the payment reader 22 (e.g., based on local test criteria) or the payment service system 50 (e.g., based on server test criteria, concurrent transactions, and data stored in transaction database 330). The payment reader may then take appropriate corrective action (e.g., aborting a transaction, temporarily or permanently removing power or disabling one or more components of the payment terminal, querying the payment device to gather additional information, or employing countermeasures), as described herein. The processing of steps 400 may then end.

FIG. 7 depicts a non-limiting flow diagram illustrating exemplary steps 500 for updating test criteria in accordance with some embodiments of the present disclosure. Although it will be understood that test criteria may be updated in any suitable manner and by any suitable devices, in an exemplary embodiment test criteria may be updated at payment service system 50 of payment server 40 based on information received from payment readers 20.

At step 502, processing unit 302 of payment service system 50 may receive and store reader data based on operating instructions 320 and tamper/fraud instructions 324. In some embodiments, payment service system 50 may receive server request messages from payment readers 20. Those server request messages include information that is then stored in transaction database 330, such as monitored electrical characteristics, monitored timing, monitored responses, transaction information, information about the payment terminal (e.g., location, etc.), environmental information (e.g., temperature, etc.), statistics determined therefrom, and preliminary assessments based on local test criteria. Processing may then continue to step 504.

At step 504, processing unit 302 of payment service system 50 may process server request messages to determine whether a fraudulent transaction or tamper attempt has occurred, and store information about that determination at transaction database 330, based on tamper/fraud instructions 324. As described herein, payment service system 50 may process received server request messages such as is depicted and described at steps 414-420 and step 424 of FIG. 6. The results of this processing (e.g., the results of the testing against server test criteria) may be associated with the reader data and stored at transaction database 330. Processing may then continue to step 506.

At step 506, processing unit 302 of payment service system 50 may receive feedback and store the feedback at transaction database 330 based on tamper/fraud instructions 324. Although any suitable feedback may be received and stored in accordance with the present disclosure, in some embodiments false positives and false negatives may be received and associated with transactions in transaction database 330. Feedback may also include externally updated test criteria, which may be used in step 508 and 510 to analyze data and update test criteria based on the information stored at the transaction database 330.

At step 508, processing unit 302 of payment service system 50 may analyze the data in transaction database 330 based on tamper/fraud instructions 324. In some embodiments, machine learning techniques may be utilized on the large datasets of transaction database 330, and in some embodiments, the externally updated test criteria. In some embodiments, patterns that result in fraudulent transactions may be identified based on the information stored at transaction database 330, and test criteria may be updated based on the identification. False positives and false negatives may be used to identify test criteria that should be modified. Information such as the severity of fraudulent transactions and tamper attempts or the likelihood that particular information (e.g., electrical characteristics, monitored responses, monitored timing, payment reader information, environmental information, etc.) resulted in a fraudulent transaction or tamper attempt may be used to determine which test criteria should be local test criteria and which test criteria may be server test criteria, as well as the type of corrective action that should be taken. Once the data is analyzed, processing may continue to step 510.

At step 510, processing unit 302 of payment service system 50 may update test criteria based on tamper/fraud instructions 324. In some embodiments, server test criteria may be updated at the payment service system 50 and local test criteria may be updated by transmitting an update message to payment reader 22 via network 30 and merchant device 29. Processing of steps 500 may then end.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A payment processing system for detecting attempts to engage in fraudulent payment transactions, the payment processing system comprising:
 a payment reader, comprising:
  a contact interface configured to receive a chip card, wherein the contact interface includes an input/output line configured to send an output signal and receive an input signal;
  a contact monitoring component coupled to the input/output line and configured to provide an analog monitoring voltage corresponding to voltages of the output signal and the input signal, the contact monitoring component comprising at least one sensor to measure the analog monitoring voltage;
  an analog-to-digital converter coupled to the at least one sensor and configured to convert the analog monitoring voltage to a digital monitoring signal;
  a payment reader processing unit configured to generate requests for the chip card, provide the output signal based on the requests to the chip card via the contact interface, receive the input signal from the chip card via the contact interface, and determine responses from the chip card based on the input signal, wherein one or more of the requests comprise test requests, wherein the payment reader processing unit is configured to determine electrical characteristics of the contact interface based on the digital monitoring signal and to monitor the responses from the chip card and timing of the responses from the chip card, wherein the payment reader processing unit is configured to take a first corrective action based on a comparison of local test criteria to one or more of the electrical characteristics of the contact interface, the monitored responses from the chip card, and the monitored timing of the responses from the chip card, and wherein the payment reader processing unit is configured to generate a server request message including the electrical characteristics of the contact interface, the monitored responses from the chip card, and the monitored timing of the responses from the chip card; and a first communication interface, wherein the payment reader is configured to transmit the server request message via the first communication interface; and a payment service system, comprising:

a second communication interface;

a transaction database comprising records of previous responses from previous payment transactions, previous monitored timing for the previous payment transactions, and previous electrical characteristics of the contact interface for the previous payment transactions; and a payment service system processing unit configured to receive the server request message via the second communication interface, wherein the payment service system processing unit is configured to extract, from the server request message, the electrical characteristics of the contact interface, the monitored timing of the responses from the chip card, and the monitored responses from the chip card, wherein the payment service system processing unit is configured to generate a system response message based on a comparison of server test criteria to one or more of the electrical characteristics of the contact interface, the monitored responses from the chip card, and the monitored timing of the responses from the chip card, wherein the payment service system processing unit is configured to transmit the system response message to the payment reader via the second communication interface and the first communication interface, wherein the payment reader processing unit is configured to take a second corrective action based on the system response message, and wherein the payment service system processing unit is configured to update the server test criteria based on the electrical characteristics of the contact interface, the monitored responses from the chip card, the monitored timing of the responses from the chip card, the previous electrical characteristics of the contact interface, the previous responses, and the previous monitored timing.

2. The payment processing system of claim 1, wherein the payment service system processing unit is further configured to update the local test criteria based on the electrical characteristics of the contact interface, the monitored responses from the chip card, the monitored timing of the responses from the chip card, the previous electrical characteristics of the contact interface, the previous responses, and the previous monitored timing, wherein the payment service system processing unit is configured to generate an update message including the updated local test criteria and transmit the update message to the payment reader via the second communication interface and the first communication interface, and wherein payment reader processing unit is configured to update the local test criteria based on the update message.

3. The payment processing system of claim 2, wherein the payment service system processing unit is further configured to receive information indicating that a previous payment transaction corresponds to a false positive or a false negative, to store information relating the false positive or the false negative to the previous payment transaction at the transaction database, and to update the server test criteria and the local test criteria based on the false positive or the false negative.

4. The payment processing system of claim 1, wherein the payment reader processor is configured to abort a transaction or query the chip card as the first corrective action, and to remove power from one or more components of the payment reader, disable one or more components of the payment reader, or employ countermeasures at the payment reader as the second corrective action.

5. A payment terminal, comprising:

a payment interface configured to interface with a payment device;

a monitoring component coupled to the payment interface and comprising at least one sensor configured to provide a measurement related to the payment interface;

a processing unit configured to generate requests for the payment device, provide the requests to the payment device via the payment interface, and receive responses from the payment device via the payment interface, wherein the processing unit is connected to the monitoring component to receive a monitoring signal corresponding to the measurement from the sensor and determine electrical characteristics of the payment interface based on the monitoring signal, and wherein the processing unit is configured to take a first corrective action based on a comparison of one or more of the responses from the payment device and the electrical characteristics of the payment interface to local test criteria; and a communication interface, wherein the processing unit is configured to generate a server request message based on the responses from the payment device and the electrical characteristics of the payment interface, transmit the server request message via the communication interface, receive a server response message via the communication interface, and determine whether to take a second corrective action based on the server response message.

6. The payment terminal of claim 5, wherein the processing unit is further configured to monitor timing for the responses from the payment device based on the electrical characteristics of the payment interface and determine whether to take the first corrective action based on a comparison of the monitored timing to the local test criteria, and wherein the server request message is based on the responses from the payment device, the electrical characteristics of the payment interface, and the monitored timing.

7. The payment terminal of claim 5, wherein the payment interface comprises a contact interface, wherein the contact interface is configured to receive a chip card, wherein the contact interface includes an input/output line, and wherein the monitoring component is coupled to the input/output line.

8. The payment terminal of claim 7, further comprising a chip card detection interface configured to provide a detection signal while the chip card is inserted at the contact interface, and wherein the processing unit is further configured to determine whether to take the first corrective action based on a comparison of the detection signal to the local test criteria, and wherein the server request message is based on the responses from the payment device, the electrical characteristics of the payment interface, and the detection signal.

9. The payment terminal of claim 5, wherein the processing unit is configured to abort a transaction or query the payment device as the first corrective action, and to remove power from one or more components of the payment terminal, disable one or more components of the payment terminal, or employ countermeasures at the payment terminal as the second corrective action.

10. The payment terminal of claim 9, wherein the processing unit is configured to abort the transaction as the first corrective action and to disable one or more components of the payment terminal as the second corrective action.

11. The payment terminal of claim 5, wherein the electrical characteristics of the payment interface comprise one or more of voltage, current, waveform shape, inductance, and capacitance.

12. The payment terminal of claim 5, wherein the requests comprise one or more of random number test requests, error condition test requests, and message timing test requests.

13. The payment terminal of claim 5, further comprising:
a power supply; and
a power supply monitoring component configured to monitor the power supply to provide a monitored power signal, wherein the processing unit is further configured to determine whether to take the first corrective action based on a comparison of the monitored power signal to the local test criteria, and wherein the server request message is based on the responses from the payment device, the electrical characteristics of the payment interface, and monitored power signal.

14. The payment terminal of claim 5, wherein the processing unit is configured to receive an update message via the communication interface and update the local test criteria based on the update message.

15. A method for processing payment transactions at a payment terminal, comprising:
providing, from a monitoring component of the payment terminal, a monitoring signal that represents electrical characteristics of a payment interface of the payment terminal, the monitoring component comprising at least one sensor configured to provide a measurement related to the payment interface and wherein the monitoring signal corresponds to the measurement from the at least one sensor;
receiving, at a processing unit connected to the monitoring component, the monitoring signal from the monitoring component;
determining, at a processing unit of the payment terminal, the electrical characteristics of the payment interface based on the monitoring signal;
sending requests for the payment device from the processing unit to the payment interface;
receiving responses from the payment device at the processing unit via the payment interface;
determining, at the processing unit, whether to take a first corrective action based on a comparison of one or more of the responses from the payment device and the electrical characteristics of the payment interface to local test criteria;
generating, at the processing unit, a server request message based on the responses from the payment device and the electrical characteristics of the payment interface;
transmitting the server request message from the processing unit via the communication interface;
receiving a server response message at the processing unit via the communication interface;
determining, at the processing unit, whether to take a second corrective action based on the server response message; and
invoking one or more of the first corrective action or the second corrective action.

16. The method of claim 15, further comprising determining, at the processing unit, monitored timing for the responses from the payment device based on the electrical characteristics, wherein determining whether to take the first corrective action further comprises determining whether to take the first corrective action based on a comparison of the monitored timing to the local test criteria, and wherein generating the server request message comprises generating the server request message based on the responses from the payment device, the electrical characteristics of the payment interface, and the monitored timing.

17. The method of claim 15, wherein providing the monitoring signal comprises providing the monitoring signal from a contact monitoring component of a contact interface of the payment terminal, wherein the monitoring signal represents electrical characteristics of an input/output line of the contact interface.

18. The method of claim 17, further comprising providing, from a chip card detection interface of the payment terminal, a detection signal that represents whether a chip card is inserted inside the contact interface, wherein determining whether to take the first corrective action further comprises determining whether to take the first corrective action based on a comparison the local test criteria to the detection signal, and wherein generating the server request message comprises generating the server request message based on the responses from the payment device, the electrical characteristics of the payment interface, and the detection signal.

19. The method of claim 15, wherein the first corrective action comprises one or more of aborting a transaction and querying the payment device, and wherein the second corrective action comprises one or more of removing power from one or more components of the payment terminal, disabling one or more components of the payment terminal, and employing countermeasures at the payment terminal.

20. The method of claim 19, wherein the first corrective action comprises aborting a payment transaction, and wherein the second corrective action comprises disabling one or more components of the payment terminal.

* * * * *